US010797846B2

(12) United States Patent
Bai et al.

(10) Patent No.: US 10,797,846 B2
(45) Date of Patent: *Oct. 6, 2020

(54) SIGNALING OF ALTERNATIVE MODULATION CODING SCHEMES

(71) Applicant: QUALCOMM Incorporated, San Diego, CA (US)

(72) Inventors: Tianyang Bai, Bridgewater, NJ (US); Makesh Pravin John Wilson, San Diego, CA (US); Kiran Venugopal, Raritan, NJ (US); Muhammad Nazmul Islam, Littleton, MA (US); Gabi Sarkis, San Diego, CA (US); Joseph Binamira Soriaga, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/379,232

(22) Filed: Apr. 9, 2019

(65) Prior Publication Data
US 2019/0312708 A1 Oct. 10, 2019

Related U.S. Application Data

(63) Continuation of application No. 16/119,904, filed on Aug. 31, 2018, now Pat. No. 10,291,378.
(Continued)

(51) Int. Cl.
*H04L 12/28* (2006.01)
*H04L 5/00* (2006.01)
(Continued)

(52) U.S. Cl.
CPC ........... *H04L 5/0053* (2013.01); *H04W 68/02* (2013.01); *H04W 72/0413* (2013.01);
(Continued)

(58) Field of Classification Search
CPC . H04W 74/0833; H04L 1/0003; H04L 1/0009
(Continued)

(56) References Cited

U.S. PATENT DOCUMENTS 10,291,378 B1 5/2019 Bai et al.
2014/0044061 A1 2/2014 Yue et al.
(Continued)

FOREIGN PATENT DOCUMENTS

EP 3131225 A1 2/2017

OTHER PUBLICATIONS

Ericsson: "Summary of Offline Session on 7.3.3.1 (Resource Allocation)", TSG-RAN WG1 #91, 3GPP Draft; R1-1721488 Summary of Offline Session on 7.3.3.1 (Resource Allocation), 3rd Generation Partnership Project (3GPP), Mobile Competence Centre; 650, Route Des Lucioles; F-06921 Sophia-Antipolis, vol. RAN WG1, No. Reno, NV, US; Nov. 27, 2017-Dec. 1, 2017, Nov. 29, 2017 (Nov. 29, 2017), 21 Pages, XP051364007, Retrieved from the Internet: URL: http://www.3gpp.org/ftp/Meetings%5F3GPP%5FSYNC/RAN1/Docs/ [retrieved on Nov. 29, 2017].
(Continued)

*Primary Examiner* — John Pezzlo
(74) *Attorney, Agent, or Firm* — Holland & Hart LLP

(57) ABSTRACT

Wireless devices may employ techniques for indicating alternative modulation coding schemes (MCSs) (e.g., MCS values or MCS indices not associated with a default list or default MCS table). That is, communications (e.g., such as physical downlink control channel (PDCCH) transmissions carrying downlink control information (DCI), physical downlink shared channel (PDSCH) transmissions carrying uplink grants, etc.) may include information (e.g., in MCS fields and reserved fields) that indicate alternative MCSs for subsequent communications. For example, random access radio network temporary identifier (RA-RNTI) scrambled
(Continued)

DCI, random access response (RAR) messages, etc., may indicate an alternative MCS for subsequent messages in a random access procedure (e.g., for a RAR, an RRC connection request, etc.). The alternative MCS may be conveyed by indicating information such as MCS scaling factors, alternative MCS table IDs, MCS indices associated with the alternative MCS table, or some combination thereof.

30 Claims, 19 Drawing Sheets

Related U.S. Application Data

(60) Provisional application No. 62/653,497, filed on Apr. 5, 2018.

(51) Int. Cl.
*H04W 72/04* (2009.01)
*H04W 68/02* (2009.01)
*H04J 1/16* (2006.01)
*H04L 1/00* (2006.01)
*H04W 74/08* (2009.01)
*H04L 27/34* (2006.01)

(52) U.S. Cl.
CPC ............ *H04L 1/001* (2013.01); *H04L 1/0004* (2013.01); *H04L 27/34* (2013.01); *H04W 74/0833* (2013.01)

(58) Field of Classification Search
USPC ........................................ 370/252, 329, 386
See application file for complete search history.

(56) References Cited

U.S. PATENT DOCUMENTS

| | | | |
|---|---|---|---|
| 2018/0249370 A1* | 8/2018 | Zhang | H04L 1/00 |
| 2019/0045554 A1* | 2/2019 | Ye | H04W 74/0833 |
| 2019/0082431 A1* | 3/2019 | Yi | H04L 5/0057 |
| 2019/0313426 A1* | 10/2019 | Lin | H04L 1/0025 |
| 2020/0022218 A1* | 1/2020 | Chang | H04W 16/26 |

OTHER PUBLICATIONS

Intel Corporation: "On Demodulation Enhancements for LTE V2V Sidelink Communication", 3GPP TSG RAN WG1 Meeting #92, 3GPP Draft; R1-1802366-INTEL-V2X_64QAM, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 26, 2018-Mar. 2, 2018, Feb. 17, 2018 (Feb. 17, 2018), pp. 1-17, XP051397891, Retrieved from the Internet: URL: http://www.3gpp.org/ftp/tsg%5Fran/WG1%5FRL1/TSGR1%5F92/Docs/ [retrieved on Feb. 17, 2018].

International Search Report and Written Opinion—PCT/US2019/021085—ISA/EPO—Jun. 24, 2019.

Mediatek Inc: "Discussion on Modulation Enhancement", 3GPP TSG RAN WG1 Meeting #92bis, 3GPP Draft; R1-1804135—Mediatek—Discussion on Modulation Enhancement, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018, Apr. 3, 2018 (Apr. 3, 2018), 6 Pages, XP051412842, Retrieved from the Internet: URL: http://www.3gpp.org/ftp/tsg%5Fran/WG1%5FRL1/TSGR1%5F92b/Docs/ [retrieved on Apr. 3, 2018].

\* cited by examiner

SIGNALING OF ALTERNATIVE MODULATION CODING SCHEMES

CROSS REFERENCES

The present Application for Patent is a Continuation of U.S. patent application Ser. No. 16/119,904 by BAI, et al., entitled "SIGNALING OF ALTERNATIVE MODULATION CODING SCHEMES" filed Aug. 31, 2018, which claims the benefit of U.S. Provisional Patent Application No. 62/653,497 by BAI, et al., entitled "SIGNALING OF ALTERNATIVE MODULATION CODING SCHEMES," filed Apr. 5, 2018, each of which is assigned to the assignee hereof and expressly incorporated herein by reference in its entirety.

BACKGROUND

The following relates generally to wireless communications, and more specifically to alternative modulation coding scheme (MCS) signaling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE). A base station may communicate with mobile devices (e.g., UEs) via downlink and uplink. The downlink (or forward link) may refer to the communication link from the base station to a UE, and the uplink (or reverse link) may refer to the communication link from the UE to the base station.

During communications, wireless devices (e.g., base stations, UEs, etc.) may employ different modulation coding schemes (MCSs) (e.g., different implementations of modulation schemes, coding rates, transport block sizes (TBSs), spatial streams, etc.) to address different system needs. For example, higher coding rates may be associated with increased data throughput, but may be more sensitive to interference and multi-path issues, while lower coding rates may provide for more robust communications, but may be associated with lower data rates. In some examples, base stations and UEs may access an MCS table to determine the MCS to use for an uplink or downlink transmission. However, wireless communications systems may also support additional MCSs, and standard or default MCS tables may not include data entries (e.g., MCS values) that account for these alternative MCSs that may be supported by the communications system. Improved techniques for determination and indication of these alternative MCSs (e.g., MCS values not included in a default table) may thus be desired.

SUMMARY

The described techniques relate to improved methods, systems, devices, and apparatuses that support signaling of alternative modulation coding schemes (MCSs). Generally, the described techniques provide for wireless devices indicating and determining alternative MCSs (e.g., MCS values or MCS indices not associated with a default list or default MCS table). That is, communications (e.g., such as physical downlink control channel (PDCCH) transmissions carrying downlink control information (DCI), physical downlink shared channel (PDSCH) transmissions carrying uplink grants, etc.) may include information (e.g., in MCS fields and reserved fields) that indicate alternative MCSs for subsequent communications. For example, DCI messages scrambled with a random access radio network temporary identifier (RA-RNTI), random access response (RAR) messages, etc., may indicate an alternative MCS for subsequent messages in a random access procedure (e.g., for a RAR, an RRC connection request, etc.).

Alternative MCS may be conveyed by including MCS fields and reserved fields included in the transmission (e.g., in the RA-RNTI-scrambled DCI, in the RAR message, etc.). For example, reserved fields may indicate a scaling factor that may be used along with an MCS indicated by an MCS field to indicate or determine an alternative MCS (e.g., by multiplying one or more aspects of the indicated MCS, such as a code rate, by the indicated scaling factor). In other examples, reserved fields may indicate use of an alternative (e.g., non-default) MCS table. The reserved field may include an indication of the alternative MCS table that may be used with the MCS index indicated by the MCS field (e.g., an MCS index indicated by the MCS field may be used with the indicated alternative MCS table to determine an alternative MCS). Alternatively, the reserved field may itself indicate an MCS index associated with the alternative MCS field (e.g., the MCS field may, in some cases, be unused or set to all zeros to indicate a reserved field indicates an MCS index associated with an alternative MCS table).

A method of wireless communication is described. The method may include identifying a default set of MCS values and receiving, at a UE, a DCI message including an indication of a scaling factor, wherein the indication of a scaling factor comprises an indication of whether an MCS value for a PDSCH transmission is included in the default set of MCS values. The method may further include receiving, from a base station, the PDSCH transmission based on the default set of MCS values and the scaling factor.

An apparatus for wireless communication is described. The apparatus may include a processor, memory in electronic communication with the processor, and instructions stored in the memory. The instructions may be executable by the processor to cause the apparatus to identify a default set of MCS values and receive, at a UE, a DCI message including an indication of a scaling factor, wherein the indication of a scaling factor comprises an indication of whether an MCS value for a PDSCH transmission is included in the default set of MCS values. The instructions may be further executable by the processor to cause the apparatus to receive, from a base station, the PDSCH transmission based on the default set of MCS values and the scaling factor.

Another apparatus for wireless communication is described. The apparatus may include means for identifying a default set of MCS values and means for receiving, at a UE, a DCI message including an indication of a scaling factor, wherein the indication of a scaling factor comprises an indication of whether an MCS value for a PDSCH transmission is included in the default set of MCS values. The apparatus may further include means for receiving, from a base station, the PDSCH transmission based on the default set of MCS values and the scaling factor.

A non-transitory computer-readable medium storing code for wireless communication is described. The code may include instructions executable by a processor to identify a default set of MCS values and receive, at a UE, a DCI message including an indication of a scaling factor, wherein the indication of a scaling factor comprises an indication of whether an MCS value for a PDSCH transmission is included in the default set of MCS values. The code may include further instructions operable to cause a processor to receive, from a base station, the PDSCH transmission based on the default set of MCS values and the scaling factor.

In some examples of the method, apparatuses, and non-transitory computer-readable medium described herein, the PDSCH transmission includes a RAR message. Some examples of the method, apparatuses, and non-transitory computer-readable medium described herein may further include operations, features, means, or instructions for transmitting, to the base station, a random access preamble, where the RAR message may be in response to the random access preamble.

In some examples of the method, apparatuses, and non-transitory computer-readable medium described herein, the RAR message includes a second message (Msg2) in a random access procedure. In some examples of the method, apparatuses, and non-transitory computer-readable medium described herein, the DCI message may be scrambled with a random access radio network temporary identifier (RA-RNTI), a system information radio network temporary identifier (SI-RNTI), a paging radio network temporary identifier (P-RNTI), or a temporary cell radio network temporary identifier (TC-RNTI).

Some examples of the method, apparatuses, and non-transitory computer-readable medium described herein may further include operations, features, means, or instructions for determining an MCS value for the PDSCH transmission based at least in part on multiplying an MCS value of the default set of MCS values by the scaling factor.

In some examples of the method, apparatuses, and non-transitory computer-readable medium described herein, multiplying the MCS value of the default set of MCS values by the scaling factor further may include operations, features, means, or instructions for identifying a code rate associated with the MCS value of the default set of MCS values and multiplying the identified code rate by the scaling factor, where a code rate associated with the determined MCS value for the PDSCH transmission may be based on the multiplication.

Some examples of the method, apparatuses, and non-transitory computer-readable medium described herein may further include operations, features, means, or instructions for receiving an indication of the MCS value of the default set of MCS values, where the multiplication may be based on the indication of the MCS value of the default set of MCS values. In some examples of the method, apparatuses, and non-transitory computer-readable medium described herein, the MCS value of the default set of MCS values corresponds to a lowest MCS value of the default set of MCS values.

In some examples of the method, apparatuses, and non-transitory computer-readable medium described herein, the indication of the scaling factor may be the indication of whether the MCS value for the PDSCH transmission may be included in the default set of MCS values. In some examples of the method, apparatuses, and non-transitory computer-readable medium described herein, the indication of whether the MCS value for the PDSCH transmission may be included in the default set of MCS values includes at least one bit of a reserved field of the DCI message.

Some examples of the method, apparatuses, and non-transitory computer-readable medium described herein may further include operations, features, means, or instructions for receiving an indication that the MCS value for the PDSCH transmission is included in a second set of MCS values. Some examples of the method, apparatuses, and non-transitory computer-readable medium described herein may further include operations, features, means, or instructions for receiving an indication of an MCS value of a second set of MCS values, where the MCS value for the PDSCH transmission may be determined based on the received indication of the MCS value of the second set of MCS values. In some examples of the method, apparatuses, and non-transitory computer-readable medium described herein, the MCS value of the second set of MCS values indicates a code rate, a modulation scheme, or a combination thereof.

In some examples of the method, apparatuses, and non-transitory computer-readable medium described herein, the indication of the MCS value of the second set of MCS values may be the indication that the MCS value for the PDSCH transmission may be included in the second set of MCS values. In some examples of the method, apparatuses, and non-transitory computer-readable medium described herein, the indication of whether the MCS value for the PDSCH transmission may be included in the default set of MCS values includes an indication that the MCS value for the PDSCH transmission may be included in the second set of MCS values.

Some examples of the method, apparatuses, and non-transitory computer-readable medium described herein may further include operations, features, means, or instructions for receiving an MCS index field and identifying an index associated with the second set of MCS values based on the MCE index field and the indication of whether the MCS value for the PDSCH transmission may be included in the default set of MCS values. In some examples of the method, apparatuses, and non-transitory computer-readable medium described herein, the indication of the MCS value of the second set of MCS values includes at least one bit of a reserved field of the DCI message.

A method of wireless communication is described. The method may include identifying a default set of MCS values and receiving, at a UE, a downlink message including an indication of a scaling factor, wherein the indication of a scaling factor comprises an indication of whether an MCS value for an uplink transmission is included in the default set of MCS values. The method may further include transmitting, to a base station, the uplink transmission based on the default set of MCS values and the scaling factor.

An apparatus for wireless communication is described. The apparatus may include a processor, memory in electronic communication with the processor, and instructions stored in the memory. The instructions may be executable by the processor to cause the apparatus to identify a default set of MCS values and receive, at a UE, a downlink message including an indication of a scaling factor, wherein the indication of a scaling factor comprises an indication of whether an MCS value for an uplink transmission is included in the default set of MCS values. The instructions may be further executable by the processor to cause the apparatus to transmit, to a base station, the uplink transmission based on the default set of MCS values and the scaling factor.

Another apparatus for wireless communication is described. The apparatus may include means for identifying a default set of MCS values and means for receiving, at a UE, a downlink message including an indication of a scaling factor, wherein the indication of a scaling factor comprises an indication of whether an MCS value for an uplink transmission is included in the default set of MCS values. The apparatus may further include means for transmitting, to a base station, the uplink transmission based on the default set of MCS values and the scaling factor.

A non-transitory computer-readable medium storing code for wireless communication is described. The code may include instructions executable by a processor to identify a default set of MCS values and receive, at a UE, a downlink message including an indication of a scaling factor, wherein the indication of a scaling factor comprises an indication of whether an MCS value for an uplink transmission is included in the default set of MCS values. The code may include further instructions executable by a processor to transmit, to a base station, the uplink transmission based on the default set of MCS values and the scaling factor.

In some examples of the method, apparatuses, and non-transitory computer-readable medium described herein, the downlink message is a RAR message and the uplink transmission is an RRC connection request message. Some examples of the method, apparatuses, and non-transitory computer-readable medium described herein may further include operations, features, means, or instructions for transmitting the RRC connection request in response to the RAR message. In some examples of the method, apparatuses, and non-transitory computer-readable medium described herein, the RAR message may be a Msg2 in a random access procedure and the RRC connection request message includes a third message (Msg3) in the random access procedure.

Some examples of the method, apparatuses, and non-transitory computer-readable medium described herein may further include operations, features, means, or instructions for determining an MCS value for the RRC connection request message based at least in part on multiplying an MCS value of the default set of MCS values by the scaling factor. In some examples of the method, apparatuses, and non-transitory computer-readable medium described herein, multiplying the MCS value of the default set of MCS values by the scaling factor further may include operations, features, means, or instructions for identifying a code rate associated with the MCS value of the default set of MCS values and multiplying the identified code rate by the scaling factor, where a code rate associated with the determined MCS value for the RRC connection request message may be based on the multiplication.

Some examples of the method, apparatuses, and non-transitory computer-readable medium described herein may further include operations, features, means, or instructions for receiving an indication of the MCS value of the default set of MCS values, where the multiplication may be based on the indication of the MCS value of the default set of MCS values. In some examples of the method, apparatuses, and non-transitory computer-readable medium described herein, the MCS value of the default set of MCS values corresponds to a lowest MCS value of the default set of MCS values. In some examples of the method, apparatuses, and non-transitory computer-readable medium described herein, the indication of the scaling factor may be the indication of whether the MCS value for the RRC connection request message may be included in the default set of MCS values.

In some examples of the method, apparatuses, and non-transitory computer-readable medium described herein, the indication of whether the MCS value for the RRC connection request message may be included in the default set of MCS values includes at least one bit of a reserved field of the RAR message. Some examples of the method, apparatuses, and non-transitory computer-readable medium described herein may further include operations, features, means, or instructions for receiving an indication that the MCS value for the RRC connection request message may be included in a second set of MCS values.

Some examples of the method, apparatuses, and non-transitory computer-readable medium described herein may further include operations, features, means, or instructions for receiving an indication of an MCS value of the second set of MCS values, where the MCS value for the RRC connection request message may be determined based on the received indication of the MCS value of the second set of MCS values. In some examples of the method, apparatuses, and non-transitory computer-readable medium described herein, the MCS value of the second set of MCS values indicates a code rate, a modulation scheme, or a combination thereof.

In some examples of the method, apparatuses, and non-transitory computer-readable medium described herein, the indication of the MCS value of the second set of MCS values may be the indication that the MCS value for the RRC connection request message may be included in the second set of MCS values. In some examples of the method, apparatuses, and non-transitory computer-readable medium described herein, the indication that the MCS value for the RRC connection request message may be included in the second set of MCS values may be the indication of whether the MCS value for the RRC connection request message may be included in the default set of MCS values.

Some examples of the method, apparatuses, and non-transitory computer-readable medium described herein may further include operations, features, means, or instructions for identifying an index associated with the second set of MCS values based on the indication that the MCS value for the RRC connection request message may be included in the second set of MCS values. Some examples of the method, apparatuses, and non-transitory computer-readable medium described herein may further include operations, features, means, or instructions for receiving an MCS index field and identifying an index associated with the second set of MCS values based on the MCE index field and the indication that the MCS value for the RRC connection request message may be included in the second set of MCS values.

In some examples of the method, apparatuses, and non-transitory computer-readable medium described herein, the indication that the MCS value for the RRC connection request message may be included in the second set of MCS values includes at least one bit of a reserved field of the RAR message.

A method of wireless communication is described. The method may include identifying a default set of MCS values, transmitting, to a UE, a DCI message including an indication of a scaling factor, wherein the indication of the scaling factor comprises an indication of whether an MCS value for a PDSCH transmission is included in the default set of MCS values, and transmitting, to the UE, the PDSCH transmission based on the default set of MCS values and the scaling factor.

An apparatus for wireless communication is described. The apparatus may include a processor, memory in electronic communication with the processor, and instructions stored in the memory. The instructions may be executable by the processor to cause the apparatus to identify a default set of MCS values, transmit, to a UE, a DCI message including an indication of a scaling factor, wherein the indication of the scaling factor comprises an indication of whether an MCS value for a PDSCH transmission is included in the default set of MCS values, and transmit, to the UE, the PDSCH transmission based on the default set of MCS values and the scaling factor.

Another apparatus for wireless communication is described. The apparatus may include means for identifying a default set of MCS values, means for transmitting, to a UE, a DCI message including an indication of a scaling factor, wherein the indication of the scaling factor comprises an indication of whether an MCS value for a PDSCH transmission is included in the default set of MCS values, and means for transmitting, to the UE, the PDSCH transmission based on the default set of MCS values and the scaling factor.

A non-transitory computer-readable medium storing code for wireless communication is described. The code may include instructions executable by a processor to identify a default set of MCS values, transmit, to a UE, a DCI message including an indication of a scaling factor, wherein the indication of the scaling factor comprises an indication of whether an MCS value for a PDSCH transmission is included in the default set of MCS values, and transmit, to the UE, the PDSCH transmission based on the default set of MCS values and the scaling factor.

In some examples of the method, apparatuses, and non-transitory computer-readable medium described herein, the PDSCH transmission includes a RAR message. Some examples of the method, apparatuses, and non-transitory computer-readable medium described herein may further include operations, features, means, or instructions for receiving, from the UE, a random access preamble, where the RAR message may be transmitted in response to the random access preamble. In some examples of the method, apparatuses, and non-transitory computer-readable medium described herein, the RAR message may be a Msg2 in a random access procedure. In some examples of the method, apparatuses, and non-transitory computer-readable medium described herein, the DCI message may be scrambled with a RA-RNTI, a SI-RNTI, a P-RNTI, or a TC-RNTI.

Some examples of the method, apparatuses, and non-transitory computer-readable medium described herein, the scaling factor may be based on the MCS value for the PDSCH transmission and an MCS value of the default set of MCS values.

In some examples of the method, apparatuses, and non-transitory computer-readable medium described herein, the scaling factor may be based on a code rate associated with the MCS value for the PDSCH transmission and a code rate associated with the MCS value of the default set of MCS values. Some examples of the method, apparatuses, and non-transitory computer-readable medium described herein may further include operations, features, means, or instructions for transmitting an indication of the MCS value of the default set of MCS values. In some examples of the method, apparatuses, and non-transitory computer-readable medium described herein, the MCS value of the default set of MCS values corresponds to a lowest MCS value of the default set of MCS values.

In some examples of the method, apparatuses, and non-transitory computer-readable medium described herein, the indication of the scaling factor may be the indication of whether the MCS value for the PDSCH transmission may be included in the default set of MCS values. In some examples of the method, apparatuses, and non-transitory computer-readable medium described herein, the indication of whether the MCS value for the PDSCH transmission may be included in the default set of MCS values includes at least one bit of a reserved field of the DCI message. Some examples of the method, apparatuses, and non-transitory computer-readable medium described herein may further include operations, features, means, or instructions for transmitting an indication of an MCS value of a second set of MCS values, where the MCS value of the second set of MCS values may be based on the MCS value for the PDSCH transmission.

In some examples of the method, apparatuses, and non-transitory computer-readable medium described herein, the MCS value of the second set of MCS values indicates a code rate, a modulation scheme, or a combination thereof. In some examples of the method, apparatuses, and non-transitory computer-readable medium described herein, the indication of the MCS value of the second set of MCS values includes an MCS index and the indication of whether the MCS value for the PDSCH transmission may be included in the second set of MCS values. In some examples of the method, apparatuses, and non-transitory computer-readable medium described herein, the indication of the MCS value of the second set of MCS values may be the indication that the MCS value for the PDSCH transmission may be included in the second set of MCS values.

In some examples of the method, apparatuses, and non-transitory computer-readable medium described herein, the indication that the MCS value for the PDSCH transmission may be included in the second set of MCS values may be the indication of whether the MCS value for the PDSCH transmission may be included in the default set of MCS values. In some examples of the method, apparatuses, and non-transitory computer-readable medium described herein, the indication that the MCS value for the PDSCH transmission may be included in the second set of MCS values further indicates an index associated with the second set of MCS values. In some examples of the method, apparatuses, and non-transitory computer-readable medium described herein, the indication of the MCS value of the second set of MCS values includes at least one bit of a reserved field of the DCI message.

A method of wireless communication is described. The method may include identifying a default set of MCS values, transmitting, to a UE, a downlink message including an indication of a scaling factor, wherein the indication of the scaling factor comprises an indication of whether an MCS value for an uplink transmission is included in the default set of MCS values, and receiving, from the UE, the uplink transmission based on the default set of MCS values and the scaling factor.

An apparatus for wireless communication is described. The apparatus may include a processor, memory in electronic communication with the processor, and instructions stored in the memory. The instructions may be executable by the processor to cause the apparatus to identify a default set of MCS values, transmit, to a UE, a downlink message including an indication of a scaling factor, wherein the indication of the scaling factor comprises an indication of whether an MCS value for an uplink transmission is included in the default set of MCS values, and receive, from the UE, the uplink transmission based on the default set of MCS values and the scaling factor.

Another apparatus for wireless communication is described. The apparatus may include means for identifying a default set of MCS values, means for transmitting, to a UE, a downlink message including an indication of a scaling factor, wherein the indication of the scaling factor comprises an indication of whether an MCS value for an uplink transmission is included in the default set of MCS values, and means for receiving, from the UE, the uplink transmission based on the default set of MCS values and the scaling factor.

A non-transitory computer-readable medium storing code for wireless communication is described. The code may include instructions executable by a processor to identify a default set of MCS values, transmit, to a UE, a downlink message including an indication of a scaling factor, wherein the indication of the scaling factor comprises an indication of whether an MCS value for an uplink transmission is included in the default set of MCS values, and receive, from the UE, the uplink transmission based on the default set of MCS values and the scaling factor.

In some examples of the method, apparatuses, and non-transitory computer-readable medium described herein, the downlink message includes a RAR message and the uplink transmission includes an RRC connection request message. In some examples of the method, apparatuses, and non-transitory computer-readable medium described herein, the RRC connection request message may be in response to the RAR message. In some examples of the method, apparatuses, and non-transitory computer-readable medium described herein, the RAR message may be a Msg2 in a random access procedure; and the RRC connection request message may be a Msg3 in the random access procedure. In some examples of the method, apparatuses, and non-transitory computer-readable medium described herein the scaling factor may be based on the MCS value for the RRC connection request message and an MCS value of the default set of MCS values.

In some examples of the method, apparatuses, and non-transitory computer-readable medium described herein, the scaling factor may be based on a code rate associated with the MCS value for the RRC connection request message and a code rate associated with the MCS value of the default set of MCS values. Some examples of the method, apparatuses, and non-transitory computer-readable medium described herein may further include operations, features, means, or instructions for transmitting an indication of the MCS value of the default set of MCS values. In some examples of the method, apparatuses, and non-transitory computer-readable medium described herein, the MCS value of the default set of MCS values corresponds to a lowest MCS value of the default set of MCS values.

In some examples of the method, apparatuses, and non-transitory computer-readable medium described herein, the indication of the scaling factor may be the indication of whether the MCS value for the RRC connection request message may be included in the default set of MCS values. In some examples of the method, apparatuses, and non-transitory computer-readable medium described herein, the indication of whether the MCS value for the RRC connection request message may be included in the default set of MCS values includes at least one bit of a reserved field of the DCI message. Some examples of the method, apparatuses, and non-transitory computer-readable medium described herein may further include operations, features, means, or instructions for transmitting an indication that the MCS value for the RRC connection request message may be included in a second set of MCS values.

Some examples of the method, apparatuses, and non-transitory computer-readable medium described herein may further include operations, features, means, or instructions for transmitting an indication of an MCS value of the second set of MCS values, where the MCS value of the second set of MCS values may be based on the MCS value for the RRC connection request message. In some examples of the method, apparatuses, and non-transitory computer-readable medium described herein, the MCS value of the second set of MCS values indicates a code rate, a modulation scheme, or a combination thereof.

In some examples of the method, apparatuses, and non-transitory computer-readable medium described herein, the indication of the MCS value of the second set of MCS values may be the indication that the MCS value for the RRC connection request message may be included in the second set of MCS values. In some examples of the method, apparatuses, and non-transitory computer-readable medium described herein, the indication of the MCS value of the second set of MCS values includes an MCS index and the indication that the MCS value for the RRC connection request message may be included in the second set of MCS values.

In some examples of the method, apparatuses, and non-transitory computer-readable medium described herein, the indication that the MCS value for the RRC connection request message may be included in the second set of MCS values may be the indication of whether the MCS value for the RRC connection request message may be included in the default set of MCS values. In some examples of the method, apparatuses, and non-transitory computer-readable medium described herein, the indication that the MCS value for the RRC connection request message may be included in the second set of MCS values further indicates an index associated with the second set of MCS values. In some examples of the method, apparatuses, and non-transitory computer-readable medium described herein, the indication that the MCS value for the RRC connection request message may be included in the second set of MCS values includes at least one bit of a reserved field of the RAR message.

DETAILED DESCRIPTION

Figure 1:
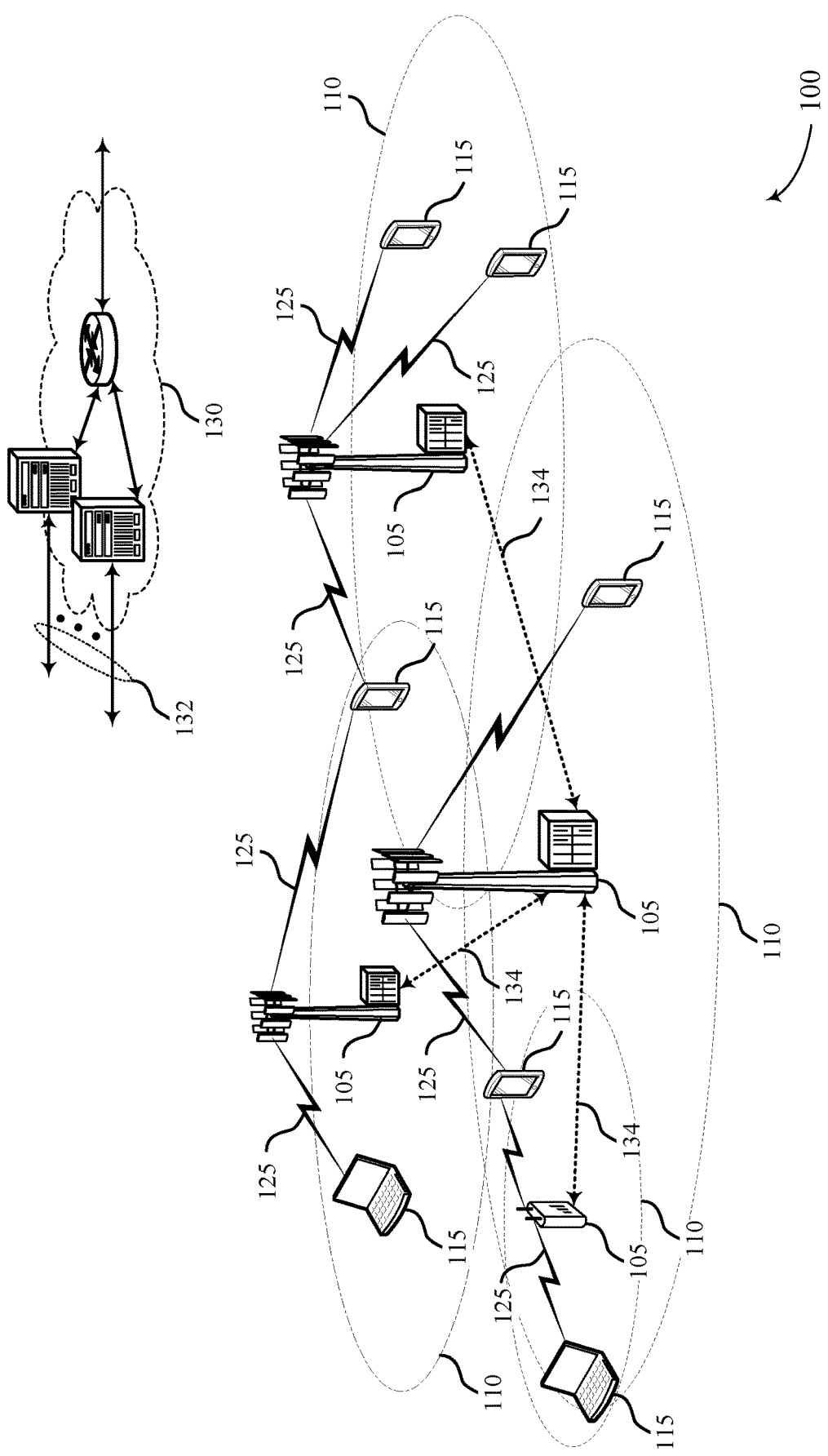
FIG. 1 illustrates an example of a wireless communications system that supports alternative MCS signaling in accordance with aspects of the present disclosure.

During communications, wireless devices (e.g., base stations, user equipment (UEs), etc.) may employ different modulation coding schemes (MCSs) (e.g., different implementations of modulation schemes, coding rates, transport block sizes (TBSs), spatial streams, etc.) to address different system needs. For example, higher coding rates may be associated with increased data throughput, but may be more sensitive to interference and multi-path issues (and lower coding rates may provide for more robust communications, but in some cases may be associated with lower data rates).

Further, wireless devices (e.g., base stations, UEs, etc.) may use beams or beamformed signals for transmission and/or reception of wireless communications. Wireless devices may thus use directional transmit beams to transmit signals, and may use certain antenna configurations or receive beams to receive signals. For example, a base station may utilize beamformed transmissions to mitigate path losses associated with high frequency communications. The base station may send a message using a downlink transmission beam, which may be associated with a coverage range (e.g., which may be referred to as the coverage area of the cell).

In some cases (e.g., during initial cell acquisition), beams used for transmissions may not be well refined (e.g., due to the lack of an established radio resource control (RRC) connection, the lack of beam refinement procedures, etc.). For example, a base station may transmit synchronization signal blocks (SSBs) that carry system information blocks (e.g., including information such as cell ID, common channel and shared channel information, RRC uplink power control, cyclic prefix length, etc.) for UE cell access. A UE may monitor for SSBs, and may initiate a random access procedure (e.g., a random access channel (RACH) procedure, a physical RACH (PRACH) procedure, etc.) to establish an RRC connection with the base station. Due to the lack of an established RRC connection (e.g., the lack of beam refinement procedures, prior to conveyance of channel and transmission parameters, etc.), messages exchanged during the random access procedure may suffer from low signal-to-noise ratio (SNR), high carrier frequency offset, etc. For example, beamforming and frequency synchronization associated with a random access response (RAR) (e.g., a random access message 2 (Msg2)) or radio resource control (RRC) connection request (e.g., a random access message 3 (Msg3)) may not be refined, and the RAR may be associated with low SNR and/or high carrier frequency offset, as timing and carrier frequency information may not yet be well synchronized. Similar issues may arise in the context of other communications as well, including other physical downlink shared channel (PDSCH) transmissions or other physical uplink shared channel (PUSCH) transmissions.

For robust decoding of such messages, low coding rates (e.g., more robust MCSs associated with low code rates) may be implemented. Low code rates may be associated with increased redundancy (e.g., repeated information bits), which may provide for more robust transmissions in the presence of interference. In some examples, base stations and UEs may access an MCS table to determine the MCS to use for uplink and downlink transmissions. However, in some scenarios (e.g., during random access message exchange), alternative MCSs (e.g., MCSs not included or listed in a default MCS table) may be desired. For example, a lowest MCS for a physical downlink shared channel (PDSCH) may correspond to a quadrature phase shift keying (QPSK) modulation scheme with a 120/1024 code rate. According to the techniques described herein, alternative MCSs (e.g., lower MCSs, MCSs not included in a default MCS table, etc.) may be determined and signaled between wireless devices. Specifically, these techniques may be implemented during random access message exchange (e.g., for base station transmission of a RAR, UE transmission of RRC connection request (random access Msg3), etc.).

In some cases, a base station may indicate alternative MCSs (e.g., some combination of a modulation scheme, code rate, transport block size (TBS), available resource elements (REs) for TBS determination, spatial streams, etc. not included in a default MCS table) to a UE during a random access procedure. For example, downlink control information (DCI) scrambled with a random access radio network temporary identifier (RA-RNTI) may include one or more indications of alternative MCSs (e.g., reserved bits or reserved fields of RA-RNTI-scrambled DCI may include information indicating an alternative MCS) for subsequent RAR messages. Generally, DCI scrambled with any RNTI (e.g., system information RNTI (SI-RNTI), paging RNTI (P-RNTI), etc.) may include indications of alternative MCS for subsequent PDSCH (e.g., broadcast PDSCH scheduled by DCI of physical downlink control channel (PDCCH)). Additionally or alternatively, downlink messages (e.g., RAR messages) may include indications of alternative MCSs (e.g., reserved bits or reserved fields of RAR messages may include information indicating an alternative MCS) for subsequent uplink transmissions (e.g., RRC connection request messages).

In some implementations, alternative MCS indications may include an indication of an MCS scaling factor. Indicated MCS scaling factors may be applied to a value (e.g., a lowest MCS value or some other MCS value indicated via other reserved bits) of the default MCS table for determination of an alternative MCS (e.g., an alternative transport block size, which may correspond to an alternative coding rate). For example, a base station may indicate a scaling factor in a reserved (e.g., an unused or, in some cases, a repurposed) field of RA-RNTI-scrambled DCI to indicate a desired alternative MCS. A UE may receive the DCI message, determine the DCI message is associated with a random access procedure (e.g., a RAR) based on the RNTI used to decode the DCI (e.g., based on the RA-RNTI scrambling), and identify the scaling factor indicated in the reserved field of the DCI. That is, a reserved field of RA-RNTI-scrambled DCI may indicate a scaling factor to be applied to an MCS indicated by the DCI (e.g., in an MCS field of the DCI). Accordingly, indicated alternative MCSs may include lower code rates than provided in default MCS tables (e.g., when the scaling factor is applied to a lowest default MCS) for more robust random access communications. Further alternative MCSs may be selected with increased granularity compared to MCSs provided in a default MCS table (e.g., when the scaling factor is applied to other indicated MCS values of the default MCS table).

Additionally or alternatively, alternative MCS indications may include an indication to use an alternative MCS table (e.g., where an alternative MCS may be identified from the indicated alternative MCS table). For example, a base station may indicate an MCS index corresponding to the alternative MCS table in RA-RNTI-scrambled DCI to indicate a desired alternative MCS. In some cases, a reserved (e.g., an unused or, in some cases, a repurposed) field of RA-RNTI-scrambled DCI may indicate use of the alternative MCS table, and an MCS field of the DCI may indicate the MCS index associated with the alternative MCS table. In other examples, a reserved field of RA-RNTI-scrambled DCI may directly indicate the MCS index of the alternative MCS table (e.g., a reserved field of RA-RNTI-scrambled DCI may include an alternative MCS index that implicitly indicates use of the alternative MCS table).

The alternative MCS indication techniques discussed above may also be applied to other transmissions (e.g., may be included in RAR messages), as further described below. Beneficially, these techniques may provide for lower MCSs (e.g., lower coding rates and/or lower orders of modulation) than otherwise provided in default MCS tables. Additionally, MCSs may be configured and implemented with increased flexibility, as new MCS tables (e.g., alternative MCS tables) may be defined and indicated, as wireless communication systems increase their support of additional MCSs, using the techniques described herein.

Aspects of the disclosure are initially described in the context of a wireless communications system. Process flows implementing described alternative MCS signaling techniques are then discussed. Aspects of the disclosure are further illustrated by and described with reference to apparatus diagrams, system diagrams, and flowcharts that relate to alternative MCS signaling.

FIG. 1 illustrates an example of a wireless communications system 100 that supports signaling of alternative MCS in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 (e.g., eMBB UEs 115) may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these.

Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 accessing a network may receive discovery signaling such as synchronization signals, a master information block (MIB), a first system information block (SIB1) and a second system information block (SIB2). For example, SIB1 may contain cell access parameters and scheduling information for other SIBs. Decoding SIB1 may enable the UE 115 to receive SIB2. SIB2 may contain RRC configuration information related to RACH procedures, paging, physical uplink control channel (PUCCH), PUSCH, power control, SRS, and cell barring.

After the UE 115 decodes SIB2, it may transmit a RACH preamble to a base station 105. This may be known as RACH message 1. For example, the RACH preamble may be randomly selected from a set of 64 predetermined sequences. This may enable the base station 105 to distinguish between multiple UEs 115 trying to access the system simultaneously. The base station 105 may respond with a random access response (RAR), or RACH message 2, that provides an uplink resource grant, a timing advance and a temporary cell radio network temporary identity (C-RNTI).

The UE 115 may then transmit an RRC connection request, or RACH message 3, along with a temporary mobile subscriber identity (TMSI) (if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message, or RACH message 4, addressed to the UE 115, which may provide a new C-RNTI. If the UE 115 receives a contention resolution message with the correct identification (ID), it may proceed with RRC setup. If the UE 115 does not receive a contention resolution message (e.g., if there is a conflict with another UE 115) it may repeat the RACH process by transmitting a new RACH preamble. In some cases, small amounts of data may be transmitted in RACH message 1 or 2, or both, and a UE 115 may remain in idle rather than establishing a radio connection upon receiving RACH message 2.

In some cases, UE 115 may enter an idle mode and periodically wake up to receive paging messages. In some cases, a UE 115 in idle mode may be assigned a paging radio network temporary identity (P-RNTI). If the serving gateway (S-GW) receives data for the UE 115, it may notify the mobility management entity (MME), which may send a paging message to every base station 105 within an area known as a tracking area. Each base station 105 within the tracking area may send a paging message with the P-RNTI. Thus, the UE may remain in idle without updating the MME until it leaves the tracking area. In some cases, a shortened local paging ID may be used for UEs 115 that do not often move from one location to another (e.g., for MTC UEs 115, such as stationary monitoring devices).

A base station 105 or a UE 115, or both, may convey data in control messages, such as physical downlink control channel (PDCCH) or physical uplink control channel (PUCCH) messages. PDCCH carries downlink control information (DCI) in control channel elements (CCEs), which may consist of nine logically contiguous resource element (RE) groups (REGs), where each REG contains 4 resource elements (REs). A resource element may include a single symbol period over a single tone. DCI includes information regarding downlink scheduling assignments, uplink resource grants, transmission scheme, uplink power control, hybrid automatic repeat request (HARD) information, MCS and other information.

The size and format of the DCI messages can differ depending on the type and amount of information that is carried by the DCI. For example, if spatial multiplexing is supported, the size of the DCI message is large compared to contiguous frequency allocations. Similarly, for a system that employs MIMO, the DCI must include additional signaling information. DCI size and format depend on the amount of information as well as factors such as bandwidth, the number of antenna ports, and duplexing mode.

PDCCH can carry DCI messages associated with multiple users, and each UE 115 may decode the DCI messages that are intended for it. For example, each UE 115 may be assigned a C-RNTI and CRC bits attached to each DCI may be scrambled based on the C-RNTI. To reduce power consumption and overhead at the UE, a limited set of CCE locations can be specified for DCI associated with a specific UE 115. CCEs may be grouped (e.g., in groups of 1, 2, 4 and 8 CCEs), and a set of CCE locations in which the UE may find relevant DCI may be specified. These CCEs may be known as a search space.

Base stations 105 and UEs 115 may employ techniques for indicating alternative MCSs (e.g., MCS values or MCS indices not associated with a default list or default MCS table). That is, communications (e.g., such as physical downlink control channel (PDCCH) transmissions carrying downlink control information (DCI), physical downlink shared channel (PDSCH) transmissions carrying uplink grants, etc.) may include information (e.g., in MCS fields and reserved fields) that indicate alternative MCSs for subsequent communications. For example, DCI scrambled with a random access radio network temporary identifier (RA-RNTI), random access response (RAR) messages, etc., may indicate an alternative MCS for subsequent messages in a random access procedure (e.g., for a RAR, an RRC connection request, etc.). The alternative MCS may be conveyed by including indications in reserved fields in the transmission that indicate information such as MCS scaling factors, alternative MCS table IDs, MCS indices associated with the alternative MCS table, or some combination thereof.

Figure 2:
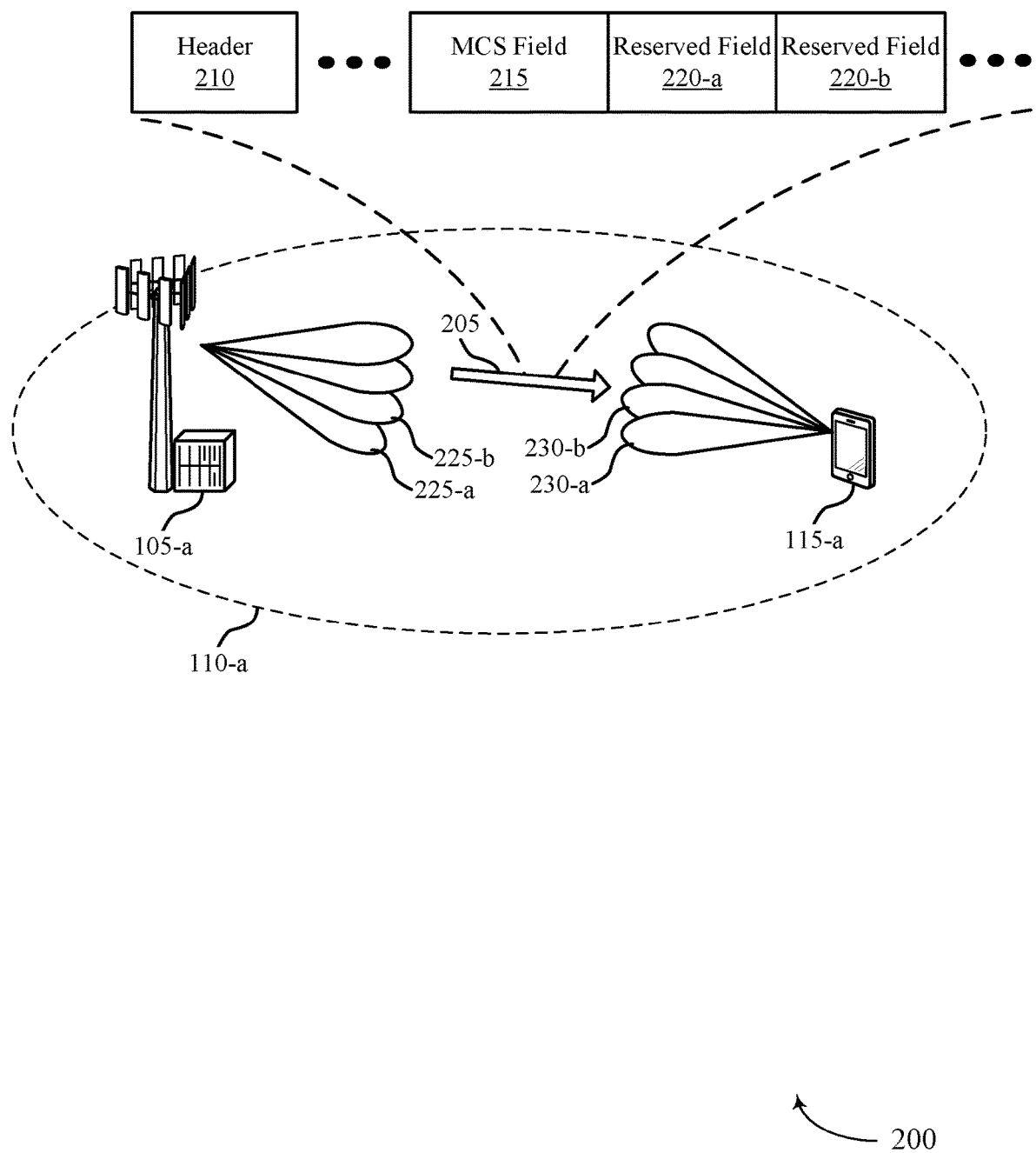
FIG. 2 illustrates an example of a wireless communications system that supports alternative MCS signaling in accordance with aspects of the present disclosure.

FIG. 2 illustrates an example of a wireless communications system 200 that supports alternative MCS signaling in accordance with aspects of the present disclosure. In some examples, wireless communications system 200 may implement aspects of wireless communications system 100. Wireless communications system 200 may include base station 105-a and UE 115-a, which may be examples of the corresponding devices described with reference to FIG. 1. Base station 105-a may provide network coverage for geographic area 110-a. Base station 105-a may signal alternative MCS values (e.g., MCS values that are not listed or included in a default MCS table) to UE 115-a via downlink transmissions 205. In some examples, downlink transmissions 205 indicating alternative MCS values may include a header field 210, an MCS field 215, and one or more reserved fields 220. For example, base station 105-a and UE 115-a may engage in a random access procedure to establish an RRC connection, as further described above with reference to FIG. 1. As described in more detail below, base station 105-a may signal alternative MCS values (e.g., via downlink transmissions 205) for the UE 115-a to use during random access message exchange (e.g., for the UE 115-a to use for reception of a RAR, for the UE 115-a to use for transmission of an RRC connection request, etc.).

In some examples, the base station 105-a and UE 115-a may exchange messages (e.g., data, control, RACH messages) over a communication link (e.g., a communication link 125). To establish the communication link, the UE 115-a (e.g., which in some cases may be an eMBB UE 115) may attempt to acquire a cell served by base station 105-a by transmitting a random access message (e.g., a random access preamble or random access Msg1) to the base station 105-a. The random access message may include a RACH preamble, which may be included in a physical RACH (PRACH) signal, and a random access radio network temporary identity (RA-RNTI) associated with the UE 115-a. After receiving the RACH message from the UE 115-a, base station 105-a may transmit a RAR (e.g., a RAR message or a random access Msg2) to the UE 115-a. The RAR may include a temporary cell RNTI (C-RNTI), which the base station 105-a may use to identify the UE 115-a. The RAR may also include an uplink grant resource for the UE 115-a. Using the uplink grant resource, the UE 115-a may transmit an RRC connection request message (e.g., random access Msg3) to the base station 105-a in order to establish an RRC connection with the base station 105-a. In response to the RRC connection request message, the base station 105-a may transmit an RRC connection setup message (e.g., random access Msg4) to the UE 115-a, which may complete the random access procedure.

In some implementations, base station 105-a and UE 115-a may communicate using beamformed or directional transmissions. For example, base station 105-a may transmit downlink transmissions 205 via downlink beams 225, and UE 115-a may transmit uplink transmissions via uplink beams 230). For example, beamformed transmissions may be used to mitigate path losses associated with high frequency communications. That is, base station 105-a and UE 115-a may include multiple antennas, and may transmit and receive signals using various antenna configurations in order to achieve directional transmission and/or reception.

In some cases (e.g., during initial cell acquisition), beams used for transmissions (e.g., beams 225, beams 230) may not be well refined (e.g., due to the lack of an established RRC connection, the lack of beam refinement procedures, etc.). For example, base station 105-a may transmit SSBs that carry system information blocks (e.g., including information such as cell ID, common channel and shared channel information, RRC uplink power control, cyclic prefix length, etc.) for UE 115-a cell access. UE 115-a may monitor for SSBs, and may initiate a random access procedure (e.g., a random access channel (RACH) procedure, a physical RACH (PRACH) procedure, etc.) to establish an RRC connection with base station 105-a. Due to the lack of an established RRC connection (e.g., the lack of beam refinement procedures, prior to conveyance of channel and transmission parameters, etc.), messages exchanged during the random access procedure may suffer from low SNR, high carrier frequency offset, etc. For example, beamforming and frequency synchronization associated with a RAR (e.g., Msg2) or RRC connection request (e.g., Msg3) may not be refined, and the RAR may be associated with low SNR and/or high carrier frequency offset, as timing and carrier frequency information may not yet be well synchronized. Similar issues may arise in the context of other communications as well, including other PDSCH transmissions.

For efficient decoding of such messages, low coding rates (e.g., more robust MCSs associated with low code rates) may be implemented. Low code rates may be associated with increased redundancy (e.g., repeated information bits), which may provide for more robust transmissions in the presence of interference. In some examples, base station 105-a and UE 115-a may access an MCS table to determine the MCS to use for uplink and downlink transmissions. However, in some scenarios (e.g., during random access message exchange), alternative MCSs (e.g., MCSs not included or listed in a default MCS table) may be desired. For example, a lowest default MCS for a PDSCH may correspond to a QPSK modulation scheme with a 120/1024 code rate. According to the techniques described herein, alternative MCSs (e.g., lower MCSs, MCSs not included in a default MCS table, etc.) may be determined and signaled between base station 105-a and UE 115-a. As a specific example, these techniques may be implemented during random access message exchange (e.g., for base station 105-a transmission of a RAR, UE 115-a transmission of RRC connection request (random access Msg3), etc.).

Wireless communications system 200 may employ techniques for indicating alternative MCSs (e.g., MCS values or MCS indices not include in a default list or default table). That is, communications (e.g., such as downlink transmission 205) may include information (e.g., reserved bits or bits in reserved fields 220) indicating alternative MCSs that are not in default or preconfigured MCS tables using the techniques described below. Downlink transmissions 205 (e.g., RA-RNTI-scrambled DCI, RAR, etc.) may indicate an alternative MCS (e.g., for a RAR, an RRC connection request, etc.) by indicating the MCS index associated with the alternative MCS is not in the default table, by indicating a scaling factor, by indicating a new MCS table ID, by indicating an MCS index associated with an alternate MCS table, or some combination thereof, as now discussed below. PDCCH transmissions may carry DCI that includes an indication of alternative MCS to be used for subsequent PDSCH transmissions (e.g., for RAR or random access Msg2 transmissions). In some cases, PDSCH transmission (e.g., such as the RAR or random access Msg2 transmission) may also carry indications of alternative MCS to be used for subsequent PUSCH transmissions (e.g., such as uplink RRC connection request messages).

In some cases, base station 105-*a* may indicate alternative MCSs (e.g., some combination of a modulation scheme, code rate, TBS, available REs for TBS determination, spatial streams, etc. not included in a default MCS table) to a UE during a random access procedure. For example, RA-RNTI-scrambled downlink DCI (e.g., downlink transmission 205) may include indications of alternative MCSs (e.g., reserved bits or reserved fields 220 of RA-RNTI-scrambled DCI may include information indicating an alternative MCS) for subsequent RAR messages. Generally, DCI scrambled with any RNTI (e.g., SI-RNTI, P-RNTI, etc.) may include indications of alternative MCS for subsequent PDSCH (e.g., broadcast PDSCH scheduled by DCI of PDCCH). Additionally or alternatively, RAR messages (e.g., downlink transmission 205) may include indications of alternative MCSs (e.g., reserved bits or reserved fields 220 of RAR messages may include information indicating an alternative MCS) for subsequent RRC connection request messages.

In some implementations, alternative MCS indications may include an indication of an MCS scaling factor. Indicated MCS scaling factors may be applied to a value (e.g., a lowest MCS value or some other MCS value indicated via other reserved bits) of the default MCS table for determination of an alternative MCS. For example, base station 105-*a* may indicate a scaling factor in a reserved field 220-*a* of RA-RNTI-scrambled DCI to indicate some desired alternative MCS. UE 115-*a* may receive the DCI message (e.g., the downlink transmission 205), determine the DCI message is associated with a random access procedure (e.g., a RAR) based on the RNTI used to decode the DCI (e.g., based on the RA-RNTI scrambling), and identify the scaling factor indicated in the reserved field 220-*a* of the DCI. That is, a reserved field 220-*a* of RA-RNTI-scrambled DCI may indicate a scaling factor to be applied to an MCS indicated by the DCI (e.g., in an MCS field 215 of the DCI). Accordingly, indicated alternative MCSs may include lower code rates than provided in default MCS tables (e.g., when the scaling factor is applied to a lowest default MCS, such as MCS0) for more robust random access communications. As another example, an MCS scaling factor may be applied to code rates in default MCS tables as part of alternative TBS determinations. In some cases, RA-RNTI-scrambled DCI may also include an indication of an MCS index of an MCS (e.g., such as MCS1, MCS2, etc.) to apply the scaling factor to (e.g., to override a default assumption to multiply the scaling factor by a lowest MCS of the default table). For example, reserved field 220-*a* of RA-RNTI-scrambled DCI may indicate a scaling factor and reserved field 220-*b* of RA-RNTI-scrambled DCI may indicate an MCS index associated with the default MCS table, such that the alternative MCS may be determined by multiplying the scaling factor by the MCS associated with the MCS index indicated by reserved field 220-*b*. MCSs may thus be configured or selected with increased granularity compared to MCSs provided in a default MCS table.

For example, the alternative MCS (e.g., the actual transmission MCS) may be determined by UE 115-*a* by multiplying the scaling factor identified in reserved field 220-*a* by a lowest MCS of a default MCS table or, in some cases, an MCS associated with an MCS index of the default MCS table identified in reserved field 220-*b*. The reserved field 220-*a* may indicate the scaling factor using some number of bits (e.g., the reserved field 220-*a* may include 3 bits), where the scaling factor may be identified as the multiplicative inverse of the decimal value, N, represented by the bits. That is, a three bit reserved field 220-*a* may indicate decimal values of N=0,1, 2, 3, 4, 5, 6, or 7, and the scaling factor indicated by the three bit reserved field 220-*a* may respectively include $$\frac{1}{N} = \frac{1}{0}, \frac{1}{1}, \frac{1}{2}, \frac{1}{3}, \frac{1}{4}, \frac{1}{5}, \frac{1}{6}, \text{ or } \frac{1}{7}.$$

As such, reserved field 220-*a* may be set to '011' to indicate a scaling factor of 1/3. In some examples, reserved field 220-*a* may be set to a decimal value of 0 or 1 (e.g., '000' or '001' respectively) to indicate the default table is to be used, and no scaling factor is to be applied (e.g., the UE 115-*a* may take the MCS from the default table as indicated by the MCS filed 215).

Accordingly, base station 105-*a* may indicate alternative MCS using bits of MCS field 215 and reserved fields 220. For example, a lowest MCS for a PDSCH may correspond to a QPSK modulation scheme with a 120/1024 code rate. Base station 105-*a* may include a reserved bit field 220-*a* set to '010' in RA-RNTI-scrambled DCI to indicate an alternative MCS of a QPSK modulation scheme with a 120/2024*1/2=120/2048 code rate. The techniques described above are discussed as being applied in DCI messaging, to set the MCS for Msg2 of a random access procedure. However, these techniques are equally applicable to indications sent in downlink messages such as Msg2 (e.g., RAR transmissions) to set the MCS for uplink transmissions such as Msg3 of a random access procedure (e.g., as further discussed with respect to FIG. 4). For example, reserved bits (e.g., reserved field 220) may be used to add a scaling factor to be applied to the MCS field 215 (e.g., a truncated MCS field for Msg2) in an RAR payload (e.g., of Msg2) to indicate alternative MCS for Msg3. Further, the techniques described above are discussed in the context of scaling a code rate associated with an MCS. By analogy, the techniques above may also be applied to other MCS parameters (e.g., a modulation scheme, a TBS, a number of OFDM symbols for TBS determination, a number of spatial streams, etc.) without departing from the scope of the present disclosure. For example, scaling may be applied to the modulation scheme (e.g., QPSK time a scaling factor of 1/2 may indicate binary phase shift keying (BPSK) modulation), a TBS index (e.g., a scaling factor may apply to a TBS), etc. As an additional example, a scaling may be applied to code rates in default MCS tables as part of alternative TBS determinations.

Additionally or alternatively, alternative MCS indications may include an indication to use an alternative MCS table (e.g., where an alternative MCS may be identified from the indicated alternative MCS table). For example, base station 105-*a* may indicate an MCS index corresponding to an alternative MCS table in RA-RNTI-scrambled DCI to indicate a desired alternative MCS (e.g., an actual transmission MCS for Msg2). In some cases, reserved field 220-*a* of RA-RNTI-scrambled DCI may indicate use of the alternative MCS table, and MCS field 215 of the DCI may indicate the MCS index associated with the alternative MCS table. For example, reserved field 220-*a* may include a single toggle bit indicating an alternative MCS table to be used for MCS determination (e.g., an alternative table may be predefined or associated with a random access procedure, and may be indicated by setting a toggle bit in reserved field 220-*a*). In other cases (e.g., in cases where several MCS tables may be used), reserved field 220-*a* may include multiple bit indicator (e.g., 2 bits) indicating an index associated with the alternative MCS table to be used for MCS determination. The reserved field 220-*a* may be used along with the MCS field 215 (e.g., which may indicate an MCS index associated with the table indicated by reserved field 220-*a*) to indicate an alternative MCS.

In other examples, reserved field 220-*a* of RA-RNTI-scrambled DCI may directly indicate the MCS index of the alternative MCS table (e.g., a reserved field of RA-RNTI-scrambled DCI may include an alternative MCS index that implicitly indicates use of the alternative MCS table). That is, reserved 220-*a* may include multiple bits (e.g., 5 bits) and may indicate the MCS index that identifies an alternative MCS of an alternative MCS table. In some cases, MCS field 215 may be set to a value of '00000' to indicate an alternative MCS table is to be used (e.g., which may prompt a receiving device to identify reserved field 220-*a* has an MCS index corresponding to a new/alternative MCS table). Alternatively, reserved field 220-*a* including a bit value of '00000' may indicate the default table is to be used (e.g., the MCS is to be determined using a default MCS table and the MCS field 215). In other cases, reserved field 220-*a* may include a bit value of '00011' indicating a third MCS value associated with an alternative MCS table may be used to determine an alternative MCS (e.g., a non-null or non-zero value in the reserved field 220-*a* may implicitly indicate a non-default MCS table is to be used, and the bit value may indicate the MCS index associated with the non-default MCS table). In some examples (e.g., in scenarios where several MCS tables may be defined), reserved field 220-*a* may indicate the MCS index that identifies an alternative MCS of an alternative MCS table and reserved field 220-*b* may indicate the alternative MCS table to be used along with the MCS index.

The alternative MCS indication techniques discussed above may also be applied to other transmissions (e.g., may be included in RAR messages), as further described with reference to FIG. 4. For example, a combination of reserved fields 220 and MCS field 215 (e.g., a truncated MCS field for Msg2) may be included in Msg2 for alternative MCS indication for Msg3. Beneficially, these techniques may provide for lower MCSs than otherwise provided in default MCS tables. Additionally, MCSs may be configured and implemented with increased flexibility, as new MCS tables (e.g., alternative MCS tables) may be defined and indicated, as wireless communication systems increase their support of additional MCSs, using the techniques described herein.

According to other implementations, signaling of alternative MCS may include signaling of a number of OFDM symbols, REs, RBs, etc., for TBS determination. That is, alternative MCS indications may, in some cases, include an indication of a number of OFDM symbols that may be used for TBS determination. For example, base station 105-*a* may indicate a number of OFDM symbols in a reserved field 220-*a* of RA-RNTI-scrambled DCI. UE 115-*a* may receive the DCI message (e.g., the downlink transmission 205), determine the DCI message is associated with a random access procedure (e.g., a RAR) based on the RNTI used to decode the DCI (e.g., based on the RA-RNTI scrambling), and identify the number of OFDM symbols indicated in the reserved field 220-*a* of the DCI. That is, a reserved field 220-*a* of RA-RNTI-scrambled DCI may indicate a number of OFDM symbols to be used to determine a TBS for a Msg2.

UE 115-*a* may receive a RB allocation (e.g., via DCI included in downlink transmission 205), and a number of OFDM symbols (e.g., indicated via reserved field 220-*a*). For example, an MCS0 may be assumed or default along with a 24 RB 12 OFDM symbol allocation. If the reserved field 220-*a* includes an indication of 2 OFDM symbols (e.g., reserved field 220-*a* indicates a bit value of '00010'), the UE 115-*a* may use the indication for TBS determination. The UE 115-*a* may then process (e.g., for RA-RNTI) the PDSCH over all 24 RBs and 12 OFDM symbols, but the TBS value may be derived as 24 RB*2 OFDM symbols*1/10 to determine a payload of approximately 56 bits. The UE 115-*a* may then repeat the coded TBS over the remaining 10 OFDM symbols to fill up the entire 12 OFDM symbol allocation. For example, a RAR (Msg2) sent from base station 105-*a* to UE 115-*a* in response to a random access preamble (Msg1) may include a fixed payload (e.g., such as a fixed payload of 56 bits per UE 115).

As another example, UE 115-*a* may determine TBS according to the following scheme. The UE 115-*a* may first determine a number of REs ($N_{RE}$) within the slot (e.g., in some cases, base station 105-*a* may indicate $N_{RE}$ in reserved fields 220). The UE 115-*a* may determine the number of REs allocated for PDSCH within a physical resource block (PRB) ($N'_{RE}$) using the equation $N'_{RE} = N_{sc}^{RB} * N_{symb}^{sh} - N_{DMRS}^{PRB} - N_{oh}^{PRB}$, where $N_{sc}^{RB} * N_{symb}^{sh}$ is the number of subcarriers in a physical resource block (e.g., 12); $N_{symb}^{sh}$ is the number of symbols (e.g., OFDM symbols) of the PDSCH allocation within the slot (e.g., 14 or 12); $N_{DMRS}^{PRB}$ is the number of REs for demodulation reference signal (DM-RS) per PRB in the scheduled duration including the overhead of the DM-RS code division multiplexing (CDM) groups indicated by DCI format 1_0/1_1; and $N_{oh}^{PRB}$ is the overhead configured by higher layer parameter Xoh-PDSCH. If the Xoh-PDSCH is not configured (e.g., a value from 0, 6, 12, or 18), the Xoh-PDSCH is may be set to 0. UE 115-*a* may determine the total number of REs allocated for PDSCH (e.g., $N_{RE}$ by $N_{RE} = \min(156, N'_{RE}) * n_{PRB}$), where $n_{PRB}$ is the total number of allocated PRBs for the UE 115-*a*. Next, an intermediate number of information bits ($N_{info}$) may be obtained by $N_{info} = N_{RE} * R * Q_m * v$, where R is the code rate; $Q_m$ is the modulation format (e.g., 2 for QPSK, 4 for 14 QAM, etc.); and v is the number of layers. TBS size may be determined from $N_{info}$ (e.g., via a combination of an equation and mapping to the table). For PDSCH conveyed via PDCCH scrambled by SI-RNTI, RA-RNTI, etc., the $N_{info}$ may be determined differently as $N_{info} = N_{RE} * R * Q_m * v * ScalingFactor$, where the scaling factor (or an indication of the scaling factor) may be carried by reserved bits in the DCI.

In some cases, the alternative MCS table may refer to a table defined for Msg2, Msg3, or both (e.g., defined for RACH procedures). Additionally, alternative MCS, and alternative MCS signaling and determination, may refer to any combination of techniques described above (e.g., alternative/lower code rates, reduced modulation schemes, indicated OFDM symbols for determination of alternative TBS, etc.).

In some implementations, DCI (e.g., conveyed in downlink transmission 205) may indicate an alternative MCS (e.g., an MCS value not included or listed in a default table) for a scheduled RAR. That is, the DCI may schedule a RAR, and may indicate an alternative MCS that the base station 105-*a* will use to transmit the RAR. For example, DCI may include an MCS field 215, as well as one or more reserved fields 220 (e.g., or reserved bits). The MCS field 215 and the one or more reserved fields 220 may together indicate an alternative MCS. According to the described techniques, the DCI may include a scaling factor along with an MCS value of a default table, or an indication of an MCS index associated with a second non-default table, to indicate the alternative MCS (e.g., that may be used by the base station 105-*a* to transmit a subsequent RAR).

Additionally or alternatively, an RAR (e.g., conveyed in downlink transmission 205) may indicate an alternative MCS (e.g., an MCS value not included or listed in a default table) for a scheduled RRC connection request. That is, the RAR include an uplink grant for the RRC connection request, and may indicate an alternative MCS for the UE 115-*a* to use for transmission of the RRC connection request. For example, the RAR may include an MCS field 215 (e.g., a truncated MCS field), as well as one or more reserved fields 220 (e.g., or reserved bits). The MCS field 215 and the one or more reserved fields 220 may together indicate an alternative MCS. According to the described techniques, the RAR may include a scaling factor along with an MCS value of a default table, or an indication of an MCS index associated with a second non-default table, to indicate the alternative MCS (e.g., that may be used by the base station 105-*a* to transmit a subsequent RAR).

Reserved fields 220 may, in some cases, include or refer to various fields (e.g., such as TPC command field, or other reserved fields, fields unused in certain DCI formats, etc.) and may be selected based on the amount of information to be conveyed (e.g., whether an indication of the MCS index associated with the alternative MCS is not in the default table, a scaling factor, a new MCS table ID, and/or an MCS index associated with an alternate MCS table is to be indicated). That is, in cases where reserved fields or unused fields are predefined, reserved field indication information as described above with reference to reserved fields 220-*a* and 220-*b* may be implemented in fields selected based on a number of bits associated with those fields.

In some examples, the techniques described above may also be applied to uplink transmissions where UE 115-*a* may use reserved fields in uplink transmissions to convey alternative MCSs to base station 105-*a* (e.g., a UE 115-*a* may, in some cases, append MCS fields 215, reserved fields 220, etc. to a random access preamble to indicate an alternative MCS associated with a Msg2, a Msg3, etc.

Figure 3:
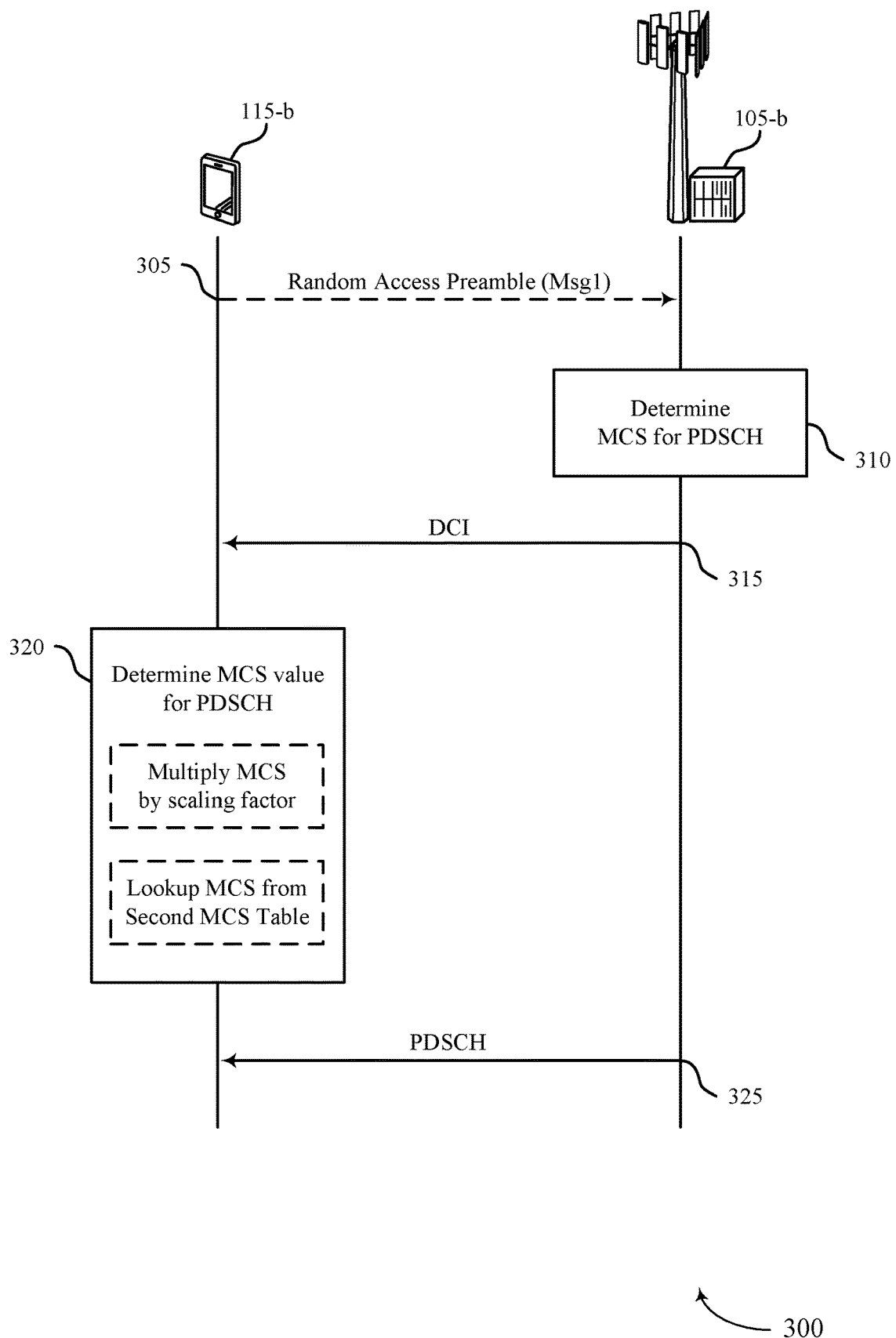
FIG. 3 illustrates an example of a process flow that supports alternative modulation coding scheme (MCS) signaling in accordance with aspects of the present disclosure.

FIG. 3 illustrates an example of a process flow 300 that supports alternative MCS signaling in accordance with aspects of the present disclosure. In some examples, process flow 300 may implement aspects of wireless communications system 100 and wireless communications system 200. Process flow 300 includes base station 105-*b* and UE 115-*b*, which may be examples of base stations 105 and UEs 115 as described with reference to FIGS. 1 and 2. Process flow 300 may illustrate base station 105-*b* providing UE 115-*b* with alternative MCS values for UE 115-*b* reception of a RAR. In the following description of the process flow 300, the operations between the UE 115-*b* and the base station 105-*b* may be transmitted in a different order than the exemplary order shown, or the operations performed by UE 115-*b* and base station 105-*b* may be performed in different orders or at different times. In some cases, certain operations may also be left out of the process flow 300, or other operations may be added to the process flow 300.

At 305, UE 115-*b* may transmit a random access preamble (e.g., Msg1) to base station 105-*b*. In some cases (e.g., for random access procedures), UE 115-*b* may select a RA-RNTI, and use the RA-RNTI for transmission of the random access preamble.

At 310, base station 105-*b* may determine an MCS for a PDSCH transmission (e.g., base station 105-*b* may determine an MCS for a RAR transmission based on the random access preamble received at 305). Determining an MCS may refer to determining a code rate, a modulation scheme, a TBS, a number of orthogonal frequency division multiplexing (OFDM) symbols to indicate a TBS, a number of spatial streams, etc. that may be used for the PDSCH transmission. For example, at 310, base station 105-*b* may identify a default set of MCS values, and determine an MCS for a subsequent PDSCH transmission is not included in the default set of MCS values (e.g., base station 105-*b* may determine an alternative MCS is not in a default MCS table, and that reserved fields of DCI are to be used for alternative MCS indication).

At 315, base station 105-*b* may identify a type of control information to transmit to UE 115-*b* in a DCI message. Base station 105-*b* may then generate the DCI message, and scramble the DCI with an RNTI according to the type of control information (e.g., the DCI may be scrambled with SI-RNTI, P-RNTI, RA-RNTI, TC-RNTI, etc.). Base station 105-*b* may transmit the scrambled DCI message to UE 115-*b*. As described with reference to FIG. 2, base station 105-*b* may use at least one bit field (e.g., a reserved field) in the DCI message to provide an indication corresponding to the alternative MCS determined at 310. That is, the DCI message may include an indication of a scaling factor, wherein the indication of a scaling factor comprises an indication of whether the MCS value for the PDSCH transmission (e.g., the alternative MCS) is included in the default set of MCS values. For example, the DCI message may include (e.g., in reserved bits) an indication of a scaling factor or an indication of an alternative MCS table, which may indicate that the MCS value for the PDSCH transmission is not included in the default set of MCS values.

UE 115-*b* may receive the DCI message, and may determine the type of control information included in the DCI message (e.g., control information for a random access message). In one example, UE 115-*b* may determine the type of control information included in DCI message based on the RNTI (e.g., a RA-RNTI) used to decode the DCI message. That is, UE 115-*b* may determine the type of control information included in the DCI message based on the RNTI used to successfully descramble the CRC bits attached to DCI message. In some cases, base station 105-*b* may scramble the DCI with the RA-RNTI used by UE 115-*b* to transmit the random access preamble at 305. In another example, UE 115-*b* may determine the type of control information included in DCI message based on the time and/or frequency location of resources used to transmit DCI message.

For example, corresponding to each RAR message, there may be a RA-RNTI that is addressed by PDCCH. The RA-RNTI may be determined based on the time/frequency resources used for the transmission of RACH preamble. For example, all UEs transmitting RACH preamble on the same resource may have the same RA-RNTI and would be addressed by the same PDCCH. Note that a UE, after sending a RACH preamble, may be monitoring a set of resources within a configured RAR window for the RACH response. This involves searching for a PDCCH with the given RA-RNTI, and in case of receiving such PDCCH, trying to receive and decode the corresponding RAR message (e.g., decode the corresponding PDSCH).

At 320, UE 115-*b* may determine an MCS value (e.g., an alternative MCS value) for a PDSCH transmission. For example, after UE 115-*b* identifies the type of control information included in DCI message, UE 115-*b* may interpret the bit fields in the DCI message based on the identification. In this example, UE 115-*b* may determine that the DCI message includes control information for a random access message (e.g., a RAR), and UE 115-*b* may interpret the reserved bit fields of the DCI message based on this determination. In particular, UE 115-*b* may determine that the one or more reserved bit fields, as well as the MCS field, include an indication of an alternative MCS for a RAR (e.g., a Msg3 transmission). UE 115-*b* may use these fields to identify an alternative MCS for receiving the subsequent PDSCH transmission from base station 105-*b*.

For example, determining the MCS value for the PDSCH may include identifying a scaling factor indicated by a reserved bit field in the DCI (e.g., the DCI may include an indication of a scaling factor). The MCS value (e.g., an alternative MCS) may then be determined by multiplying the MCS field of the DCI (e.g., an MCS value of the default set of MCS values) by the indicated scaling factor. In some cases, multiplying the default MCS value by the scaling factor includes identifying a code rate associated with the MCS value of the default set of MCS values and multiplying the identified code rate by the scaling factor. By analogy, multiplying the default MCS value by the scaling factor may include identifying any parameter associated with an MCS (e.g., a modulation scheme, a TBS, a number of REs, etc.) and multiplying the identified MCS parameter by the scaling factor.

In other cases, determining the MCS value for the PDSCH may include identifying an alternative table indicated by a reserved bit field in the DCI. The reserved bit field may, in some cases, include an alternative MCS index associated with the alternative MCS table. In other cases, the reserved bit field may indicate use of an alternative table, and the MCS field of the DCI may indicate the MCS index corresponding to the alternative table (e.g., the alternative MCS may be determined from the alternative table indication in a reserved bit field and an MCS index in an MCS filed). In some cases, UE 115-*b* may determine the MCS value for the PDSCH transmission prior to transmitting the random access preamble (e.g., 320 may occur prior to 315).

At 325, base station 105-*b* may transmit the PDSCH transmission using the alternative MCS. In the present example, the PDSCH transmission may be a RAR message (e.g., which may be transmitted in response to the random access preamble received at 315). Although illustrated in process flow 300 as occurring separately, 315 and 325 may, in some cases, occur simultaneously (e.g., DCI and PDSCH may be transmitted simultaneously).

Figure 4:
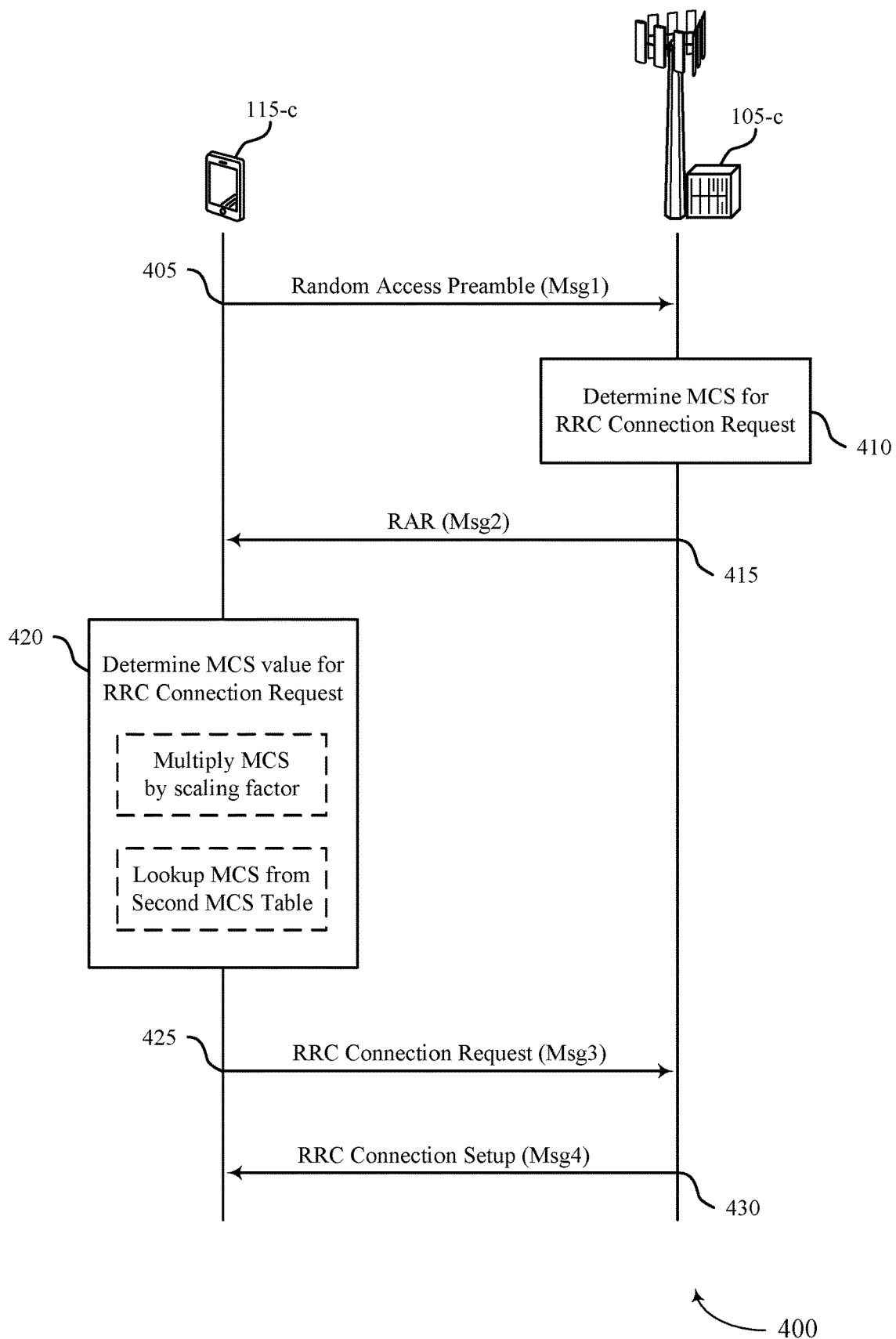
FIG. 4 illustrates an example of a process flow that supports alternative MCS signaling in accordance with aspects of the present disclosure.

FIG. 4 illustrates an example of a process flow 400 that supports alternative MCS signaling in accordance with aspects of the present disclosure. In some examples, process flow 400 may implement aspects of wireless communications system 100 and wireless communications system 200. Process flow 400 includes base station 105-*c* and UE 115-*c*, which may be examples of base stations 105 and UEs 115 as described with reference to FIGS. 1 and 2. Process flow 400 may illustrate base station 105-*c* providing UE 115-*c*, via a downlink message (e.g., a RAR message), with an alternative MCS value for UE 115-*c* transmission of an uplink transmission (e.g., an RRC connection request). In the following description of the process flow 400, the operations between the UE 115-*c* and the base station 105-*c* may be transmitted in a different order than the exemplary order shown, or the operations performed by UE 115-*c* and base station 105-*c* may be performed in different orders or at different times. In some cases, certain operations may also be left out of the process flow 400, or other operations may be added to the process flow 400.

At 405, UE 115-*c* may transmit a random access preamble (e.g., a RACH preamble, Msg1) to base station 105-*c*.

At 410, base station 105-*c* may determine an MCS for an RRC connection request (e.g., base station 105-*c* may determine an MCS for a Msg3 of the random access procedure). For example, base station 105-*c* may determine a default set of MCS values (e.g., a default MCS table). Base station 105-*c* may further determine whether the MCS value for the RRC connection request message is included in the default set of MCS values (e.g., to determine whether or not to used reserved fields of RAR for alternative MCS indication).

In some cases, base station 105-*c* may identify an MCS value of the default set of values, and determine a scaling factor based on the MCS value (e.g., the base station 105-*c* may identify an MCS value of the default MCS set and determine a scaling factor such that when multiplied by the identified MCS value gives the alternative MCS determined at 410). In other cases, base station 105-*c* may identify an alternative MCS table that may include the alternative MCS.

At 415, base station 105-*c* may transmit the RAR to UE 115-*c*. The RAR may include an indication of an alternative MCS (e.g., alternative MCS may be indicated by a truncated MCS field and one or more reserved fields of the Msg2). The RAR may include an indication of the scaling factor or an indication of an index associated with an alternative table (e.g., via reserved bits and a truncated MCS field of the RAR).

At 420, UE 115-*c* may determine an MCS value for the RRC connection request message based at least in part on the indication (e.g., in the RAR) received at 415.

At 425, UE 115-*c* may transmit the RRC connection request (e.g., Msg3) using the MCS determined at 420. The RRC connection request may be transmitted in response to the RAR message received at 415.

At 430, base station 105-*c* may transmit an RRC connection setup message (e.g., Msg4) to complete/establish the RRC connection with UE 115-*c*.

In some cases, the operations performed by UE 115-*c* and base station 105-*c* may be performed in addition to some of the operations described with reference to process flow 300 (e.g., alternative MCS may be signaled in both DCI and RAR).

Figure 5:
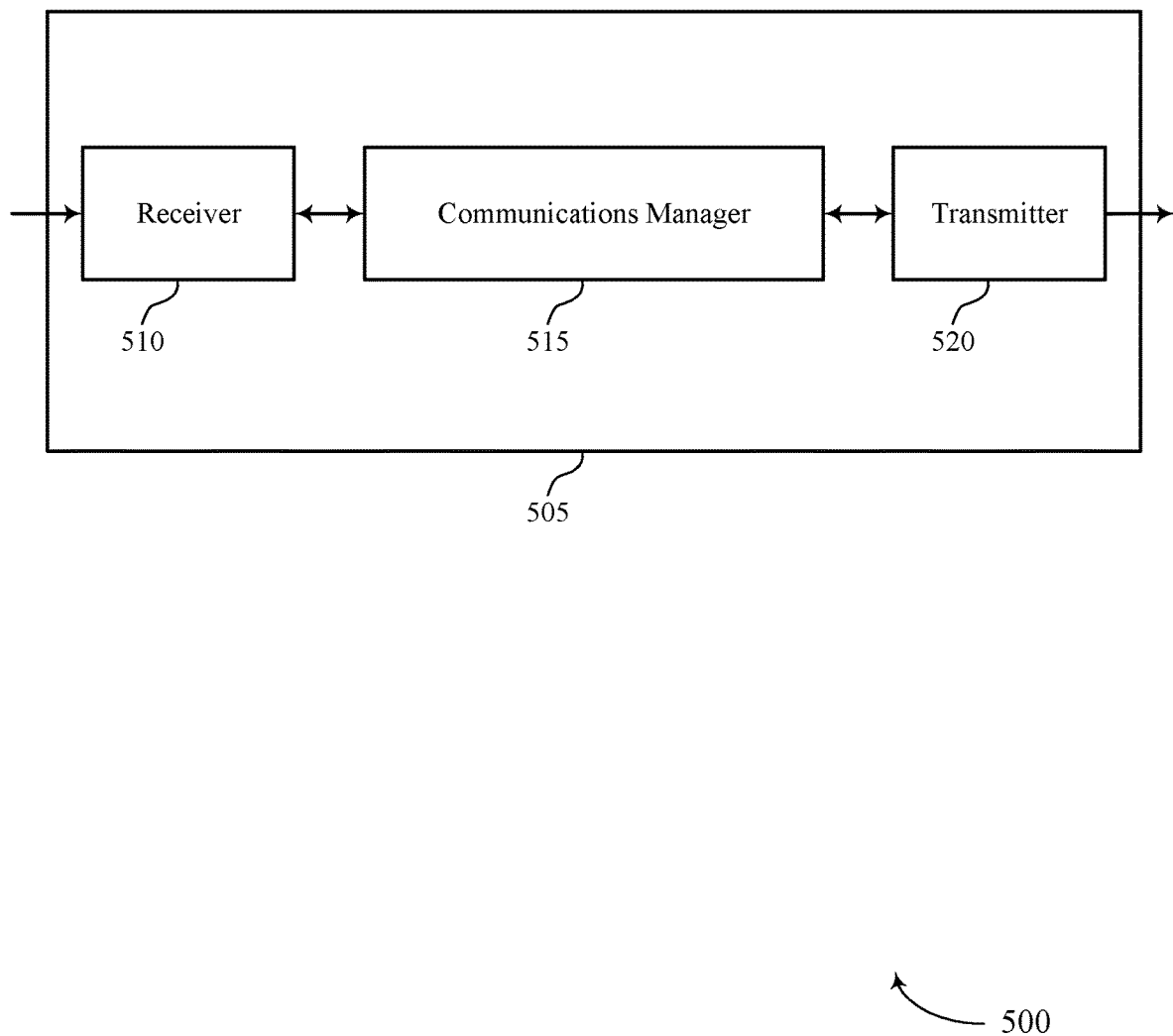
FIGS. 5 and 6 show block diagrams of devices that support alternative MCS signaling in accordance with aspects of the present disclosure.

FIG. 5 shows a block diagram 500 of a device 505 that supports alternative MCS signaling in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to alternative MCS signaling, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify a default set of MCS values and receive a DCI message including an indication of a scaling factor, wherein the indication of a scaling factor comprises an indication of whether an MCS value for a PDSCH transmission is included in the default set of MCS values. The communications manager 515 may determine the MCS value for the PDSCH transmission based on the received indication, and receive, from a base station, the PDSCH transmission based on the default set of MCS values and the scaling factor. The communications manager 515 may also identify a default set of MCS values and receive a RAR message including an indication of a scaling factor, wherein the indication of a scaling factor comprises an indication of whether an MCS value for an RRC connection request message is included in the default set of MCS values. The communications manager 515 may determine the MCS value for the RRC connection request message based on the received indication, and transmit, to a base station, the RRC connection request message based on the default set of MCS values and the scaling factor. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
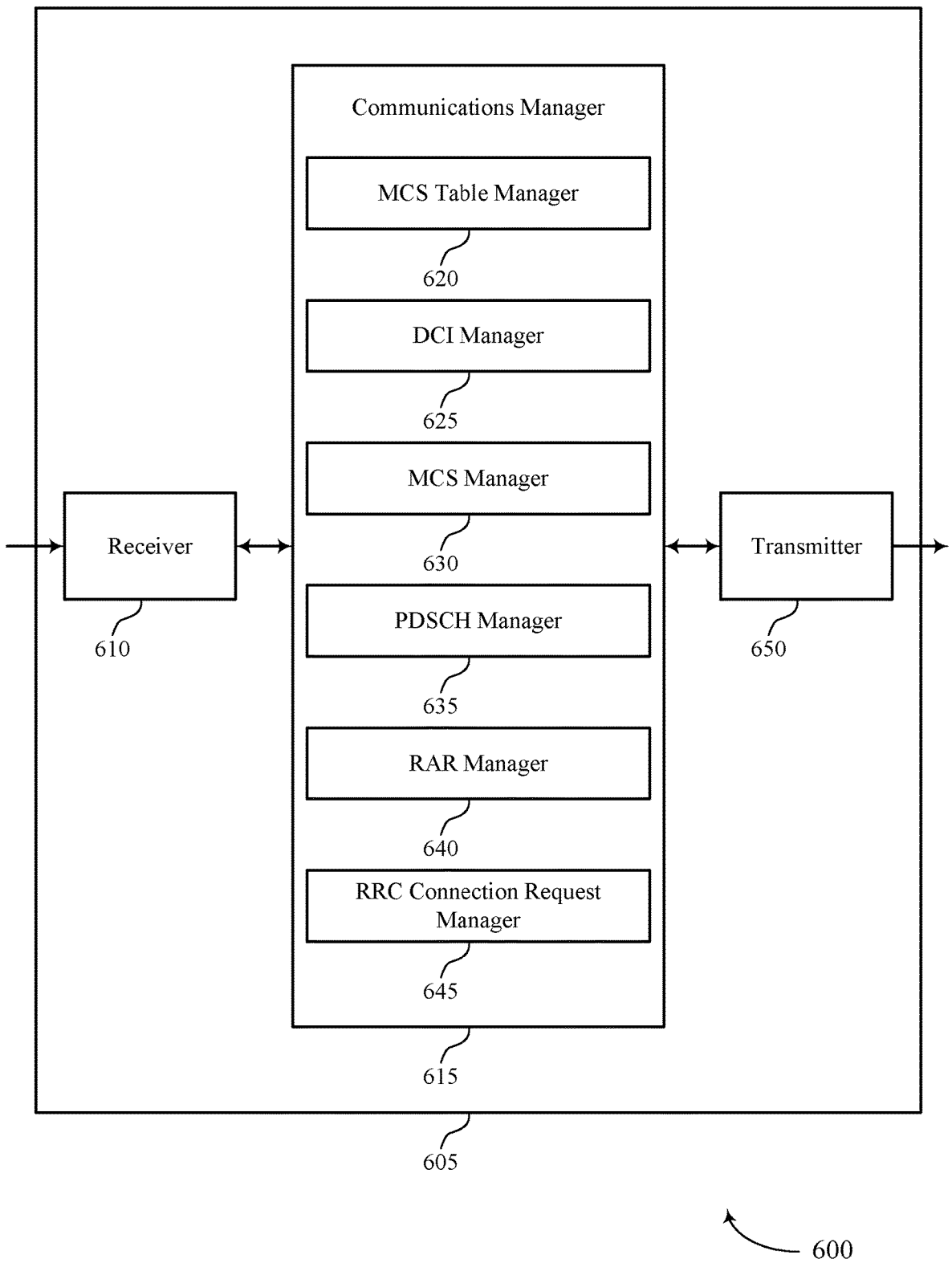

FIG. 6 shows a block diagram 600 of a device 605 that supports alternative MCS signaling in accordance with aspects of the present disclosure. The device 605 may be an example of aspects of a device 505 or a UE 115 as described herein. The device 605 may include a receiver 610, a communications manager 615, and a transmitter 650. The device 605 may also include a processor. Each of these components may be in communication with one another (e.g., via one or more buses).

The receiver 610 may receive information such as packets, user data, or control information associated with various information channels (e.g., control channels, data channels, and information related to alternative MCS signaling, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include an MCS table manager 620, a DCI manager 625, an MCS manager 630, a PDSCH manager 635, a RAR manager 640, and an RRC connection request manager 645. The communications manager 615 may be an example of aspects of the communications manager 810 described herein.

The MCS table manager 620 may identify a default set of MCS values. The DCI manager 625 may receive, at a UE, a DCI message including an indication of a scaling factor, wherein the indication of a scaling factor comprises an indication of whether an MCS value for a PDSCH transmission is included in the default set of MCS values. The MCS manager 630 may determine the MCS value for the PDSCH transmission based on the received indication. The PDSCH manager 635 may receive, from a base station, the PDSCH transmission based on the default set of MCS values and the scaling factor. The MCS table manager 620 may identify a default set of MCS values. The RAR manager 640 may receive, at a UE, a RAR message including an indication of a scaling factor, wherein the indication of a scaling factor comprises an indication of whether an MCS value for an RRC connection request message is included in the default set of MCS values. The MCS manager 630 may determine the MCS value for the RRC connection request message based on the received indication.

The RRC connection request manager 645 may transmit, to a base station, the RRC connection request message based on the default set of MCS values and the scaling factor.

The transmitter 650 may transmit signals generated by other components of the device 605. In some examples, the transmitter 650 may be collocated with a receiver 610 in a transceiver module. For example, the transmitter 650 may be an example of aspects of the transceiver 820 described with reference to FIG. 8. The transmitter 650 may utilize a single antenna or a set of antennas.

Figure 7:
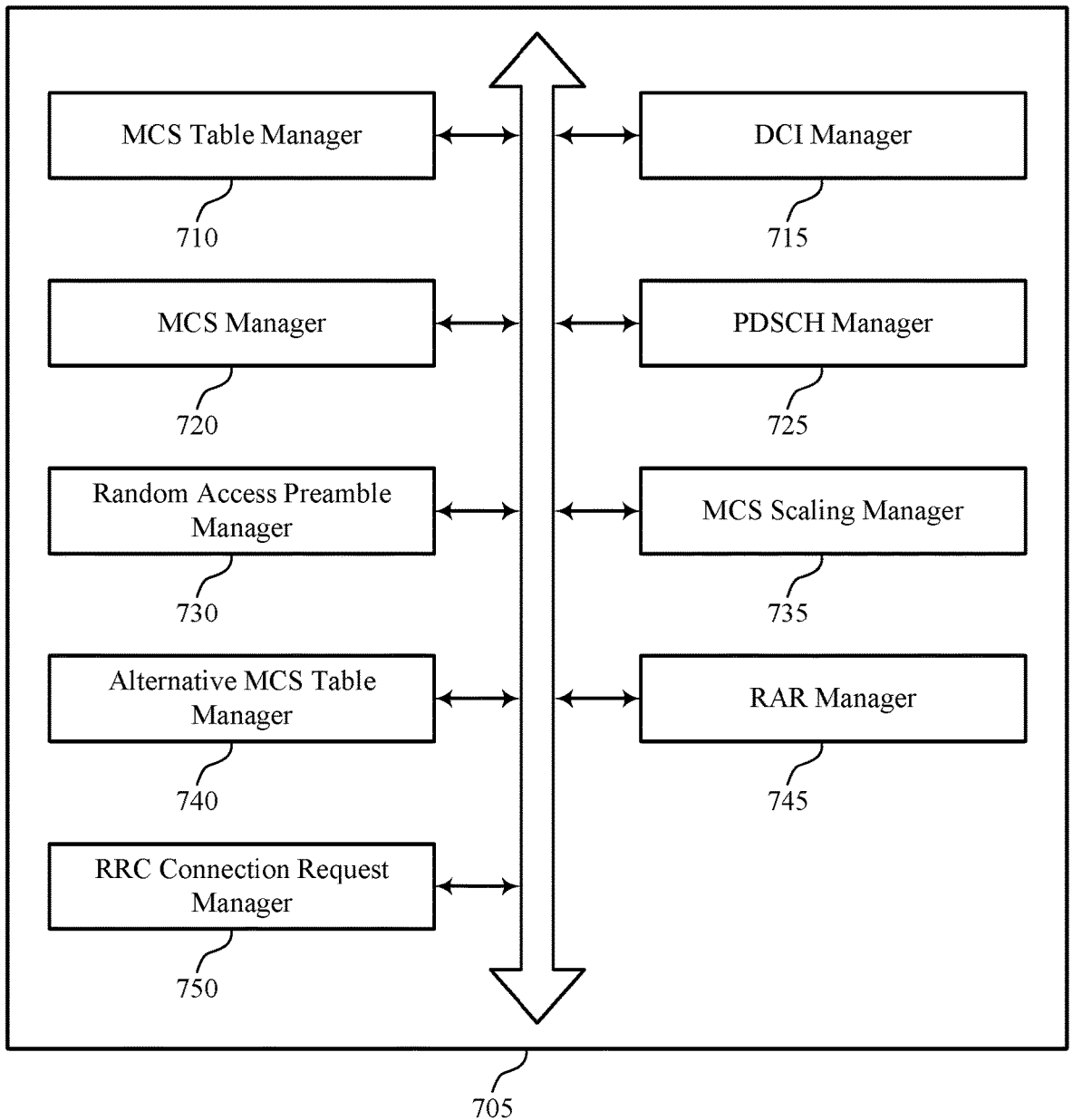
FIG. 7 shows a block diagram of a device that supports alternative MCS signaling in accordance with aspects of the present disclosure.

FIG. 7 shows a block diagram 700 of a communications manager 705 that supports alternative MCS signaling in accordance with aspects of the present disclosure. The communications manager 705 may be an example of aspects of a communications manager 515, a communications manager 615, or a communications manager 810 described herein. The communications manager 705 may include an MCS table manager 710, a DCI manager 715, an MCS manager 720, a PDSCH manager 725, a random access preamble manager 730, an MCS scaling manager 735, an alternative MCS table manager 740, a RAR manager 745, and an RRC connection request manager 750. Each of these modules may communicate, directly or indirectly, with one another (e.g., via one or more buses).

The MCS table manager 710 may identify a default set of MCS values. The DCI manager 715 may receive, at a UE, a DCI message including an indication of a scaling factor, wherein the indication of a scaling factor comprises an indication of whether an MCS value for a PDSCH transmission is included in the default set of MCS values. In some cases, the DCI message is scrambled with a RA-RNTI, a SI-RNTI, a P-RNTI, or a TC-RNTI. In some cases, the indication of whether the MCS value for the PDSCH transmission is included in the default set of MCS values includes at least one bit of a reserved field of the DCI message.

The MCS manager 720 may determine the MCS value for the PDSCH transmission based on the received indication. In some examples, the MCS manager 720 may determine the MCS value for the RRC connection request message based on the received indication. The PDSCH manager 725 may receive, from a base station, the PDSCH transmission based on the default set of MCS values and the scaling factor. In some cases, the PDSCH transmission includes a RAR message. In some cases, the RAR message includes a second message (Msg2) in a random access procedure.

The RAR manager 745 may receive, at a UE, a RAR message including an indication of a scaling factor, wherein the indication of a scaling factor comprises an indication of whether an MCS value for an RRC connection request message is included in the default set of MCS values. In some cases, the RAR message includes a second message (Msg2) in a random access procedure and the RRC connection request message includes a third message (Msg3) in the random access procedure. In some cases, the indication of whether the MCS value for the RRC connection request message is included in the default set of MCS values includes at least one bit of a reserved field of the RAR message. In some cases, the indication that the MCS value for the RRC connection request message is included in a second set of MCS values includes at least one bit of a reserved field of the RAR message.

The RRC connection request manager 750 may transmit, to a base station, the RRC connection request message based on the default set of MCS values and the scaling factor. In some examples, the RRC connection request manager 750 may transmit the RRC connection request in response to the RAR message. The random access preamble manager 730 may transmit, to the base station, a random access preamble, where the RAR message is in response to the random access preamble.

The MCS scaling manager 735 may receive an indication of a scaling factor. In some examples, the MCS scaling manager 735 may multiply an MCS value of the default set of MCS values by the scaling factor, where an MCS value for the PDSCH transmission is determined based on the multiplication. In some examples, the MCS scaling manager 735 may identify a code rate associated with the MCS value of the default set of MCS values. In some examples, the MCS scaling manager 735 may multiply the identified code rate by the scaling factor, where a code rate associated with the default set of MCS values and the scaling factor is based on the multiplication. In some examples, the MCS scaling manager 735 may receive an indication of the MCS value of the default set of MCS values, where the multiplication is based on the indication of the MCS value of the default set of MCS values. In some examples, the MCS scaling manager 735 may multiply an MCS value of the default set of MCS values by the scaling factor, where the MCS value for the RRC connection request message is determined based on the multiplication. In some examples, the MCS scaling manager 735 may multiply the identified code rate by the scaling factor, where a code rate associated with the determined MCS value for the RRC connection request message is based on the multiplication. In some cases, the MCS value of the default set of MCS values corresponds to a lowest MCS value of the default set of MCS values. In some cases, the indication of the scaling factor is the indication of whether the MCS value for the PDSCH transmission is included in the default set of MCS values. In some cases, the indication of the scaling factor is the indication of whether the MCS value for the RRC connection request message is included in the default set of MCS values.

The alternative MCS table manager 740 may receive an indication of an MCS value of a second set of MCS values, where the MCS value for the PDSCH transmission is determined based on the received indication of the MCS value of the second set of MCS values. In some examples, the alternative MCS table manager 740 may receive an MCS index field. In some examples, the alternative MCS table manager 740 may identify an index associated with the second set of MCS values based on the MCS index field and the indication of whether the MCS value for the PDSCH transmission is included in the default set of MCS values. In some examples, the alternative MCS table manager 740 may receive an indication that the MCS value for the RRC connection request message is included in a second set of MCS values. In some examples, the alternative MCS table manager 740 may receive an indication of an MCS value of the second set of MCS values, where the MCS value for the RRC connection request message is determined based on the received indication of the MCS value of the second set of MCS values. In some examples, the alternative MCS table manager 740 may identify an index associated with the second set of MCS values based on the indication that the MCS value for the RRC connection request message is included in the second set of MCS values. In some examples, the alternative MCS table manager 740 may receive an MCS index field.

In some examples, the alternative MCS table manager 740 may identify an index associated with the second set of MCS values based on the MCE index field and the indication that the MCS value for the RRC connection request message is included in the second set of MCS values. In some cases, the MCS value of the second set of MCS values indicates a code rate, a modulation scheme, or a combination thereof. In some cases, the indication of the MCS value of the second set of MCS values is the indication that the MCS value for the PDSCH transmission is included in the second set of MCS values. In some cases, the indication of whether the MCS value for the PDSCH transmission is included in the default set of MCS values includes an indication that the MCS value for the PDSCH transmission is included in the second set of MCS values. In some cases, the indication of the MCS value of the second set of MCS values includes at least one bit of a reserved field of the DCI message. In some cases, the indication of the MCS value of the second set of MCS values is the indication that the MCS value for the RRC connection request message is included in the second set of MCS values. In some cases, the indication that the MCS value for the RRC connection request message is included in the second set of MCS values is the indication of whether the MCS value for the RRC connection request message is included in the default set of MCS values.

Figure 8:
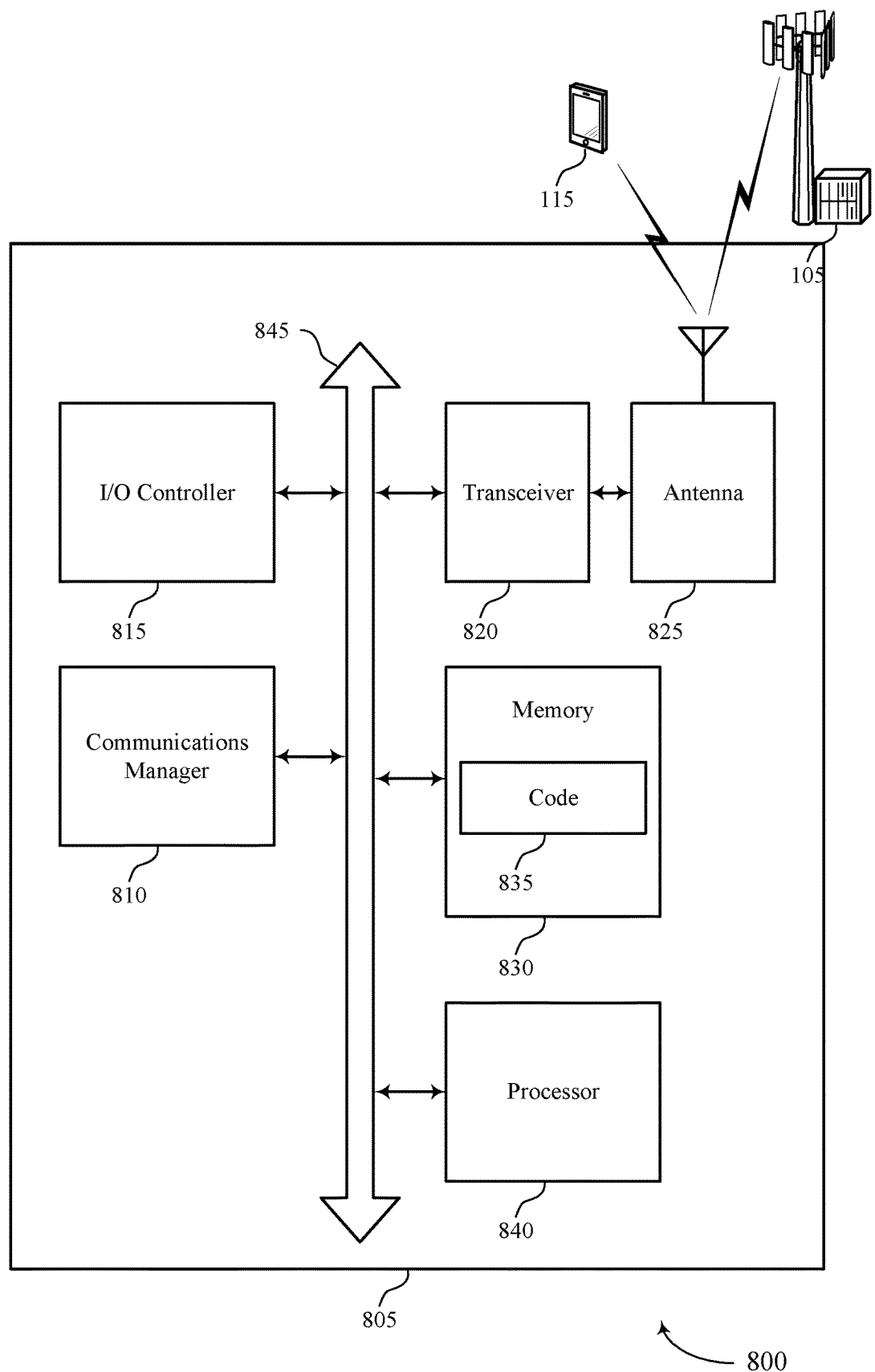
FIG. 8 shows a diagram of a system including a device that supports alternative MCS signaling in accordance with aspects of the present disclosure.

FIG. 8 shows a diagram of a system 800 including a device 805 that supports alternative MCS signaling in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify a default set of MCS values, receive a DCI message including an indication of a scaling factor, wherein the indication of a scaling factor comprises an indication of whether an MCS value for a PDSCH transmission is included in the default set of MCS values and determine the MCS value for the PDSCH transmission based on the received indication. The communications manager 810 may receive, from a base station, the PDSCH transmission based on the default set of MCS values and the scaling factor. The communications manager 810 may also identify a default set of MCS values and receive a RAR message including an indication of a scaling factor, wherein the indication of a scaling factor comprises an indication of whether an MCS value for an RRC connection request message is included in the default set of MCS values. The communications manager 810 may determine the MCS value for the RRC connection request message based on the received indication and transmit, to a base station, the RRC connection request message based on the default set of MCS values and the scaling factor.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting alternative MCS signaling).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
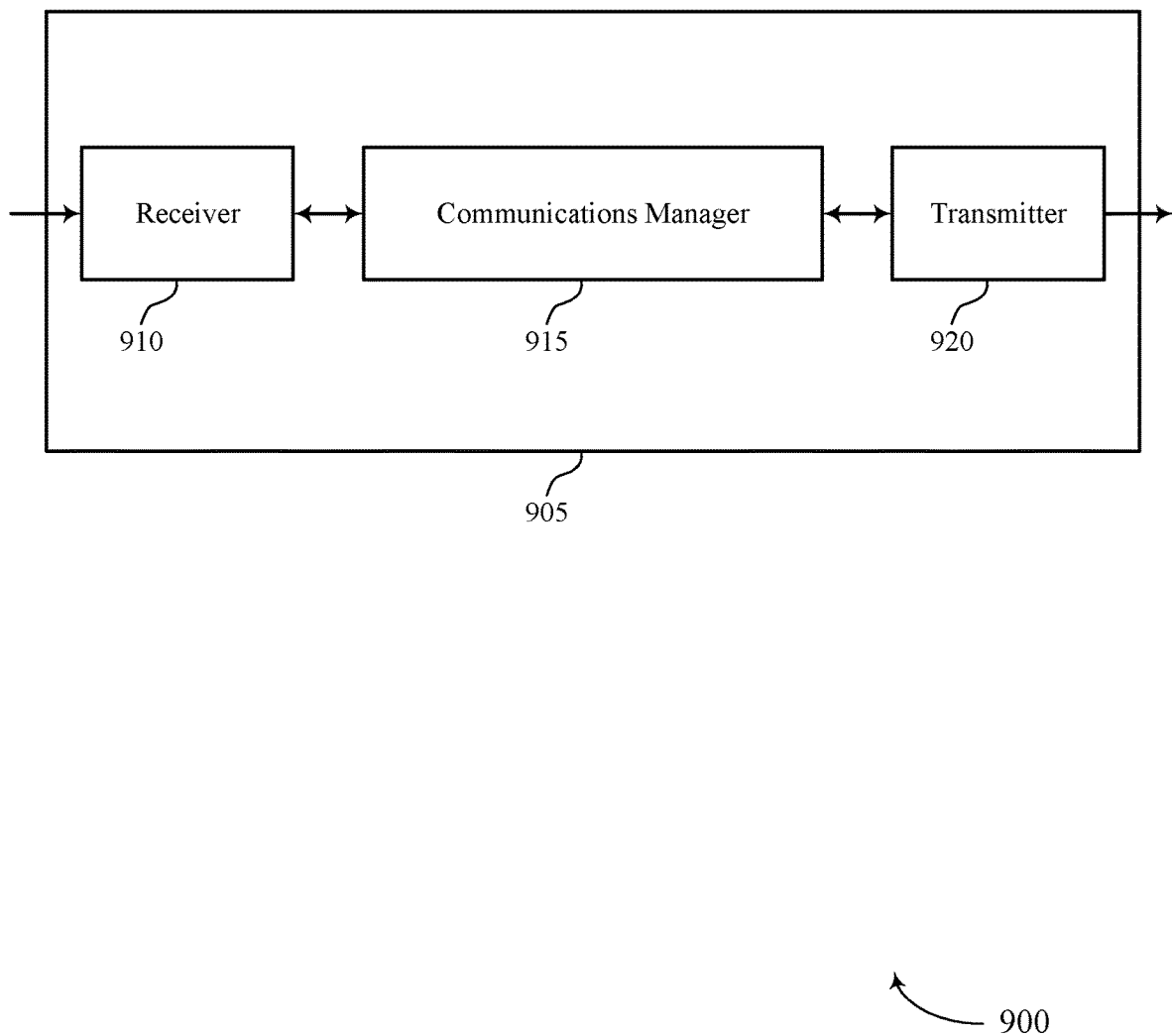
FIGS. 9 and 10 show block diagrams of devices that support alternative MCS signaling in accordance with aspects of the present disclosure.

FIG. 9 shows a block diagram 900 of a device 905 that supports alternative MCS signaling in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to alternative MCS signaling, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify a default set of MCS values and determine whether the MCS value for the PDSCH transmission is included in the default set of MCS values. The communications manager 915 may determine an MCS value for a PDSCH transmission and transmit, to a UE, a DCI message including an indication of a scaling factor, wherein the indication of a scaling factor comprises an indication of whether the MCS value for the PDSCH transmission is included in the default set of MCS values. The communications manager 915 may transmit, to the UE, the PDSCH transmission based on the default set of MCS values and the scaling factor. The communications manager 915 may also identify a default set of MCS values and determine whether the MCS value for the RRC connection request message is included in the default set of MCS values. The communications manager 915 may determine an MCS value for an RRC connection request message and transmit, to a UE, a RAR message including an indication of a scaling factor, wherein the indication of a scaling factor comprises an indication of whether the MCS value for the RRC connection request message is included in the default set of MCS values. The communications manager 915 may receive, from the UE, the RRC connection request message based on the default set of MCS values and the scaling factor. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
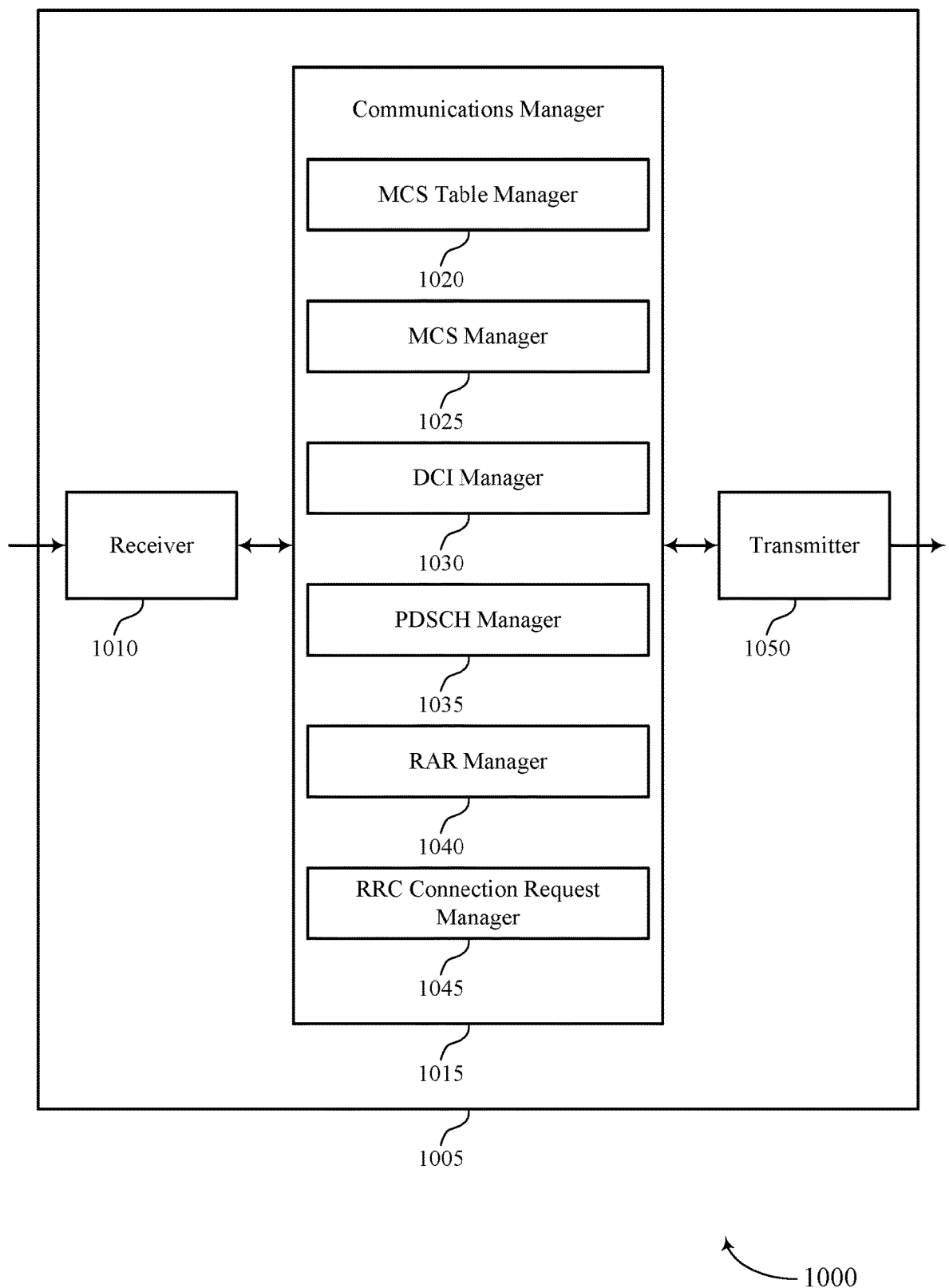

FIG. 10 shows a block diagram 1000 of a device 1005 that supports alternative MCS signaling in accordance with aspects of the present disclosure. The device 1005 may be an example of aspects of a device 905 or a base station 105 as described herein. The device 1005 may include a receiver 1010, a communications manager 1015, and a transmitter 1050. The device 1005 may also include a processor. Each of these components may be in communication with one another (e.g., via one or more buses).

The receiver 1010 may receive information such as packets, user data, or control information associated with various information channels (e.g., control channels, data channels, and information related to alternative MCS signaling, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include an MCS table manager 1020, an MCS manager 1025, a DCI manager 1030, a PDSCH manager 1035, a RAR manager 1040, and an RRC connection request manager 1045. The communications manager 1015 may be an example of aspects of the communications manager 1210 described herein.

The MCS table manager 1020 may identify a default set of MCS values and determine whether the MCS value for the PDSCH transmission is included in the default set of MCS values. The MCS manager 1025 may determine an MCS value for a PDSCH transmission. The DCI manager 1030 may transmit, to a UE, a DCI message including an indication of a scaling factor, wherein the indication of a scaling factor comprises an indication of whether the MCS value for the PDSCH transmission is included in the default set of MCS values. The PDSCH manager 1035 may transmit, to the UE, the PDSCH transmission based on the default set of MCS values and the scaling factor. The MCS table manager 1020 may identify a default set of MCS values and determine whether the MCS value for the RRC connection request message is included in the default set of MCS values. The MCS manager 1025 may determine an MCS value for an RRC connection request message.

The RAR manager 1040 may transmit, to a UE, a RAR message including an indication of a scaling factor, wherein the indication of a scaling factor comprises an indication of whether the MCS value for the RRC connection request message is included in the default set of MCS values. The RRC connection request manager 1045 may receive, from the UE, the RRC connection request message based on the default set of MCS values and the scaling factor.

The transmitter 1050 may transmit signals generated by other components of the device 1005. In some examples, the transmitter 1050 may be collocated with a receiver 1010 in a transceiver module. For example, the transmitter 1050 may be an example of aspects of the transceiver 1220 described with reference to FIG. 12. The transmitter 1050 may utilize a single antenna or a set of antennas.

Figure 11:
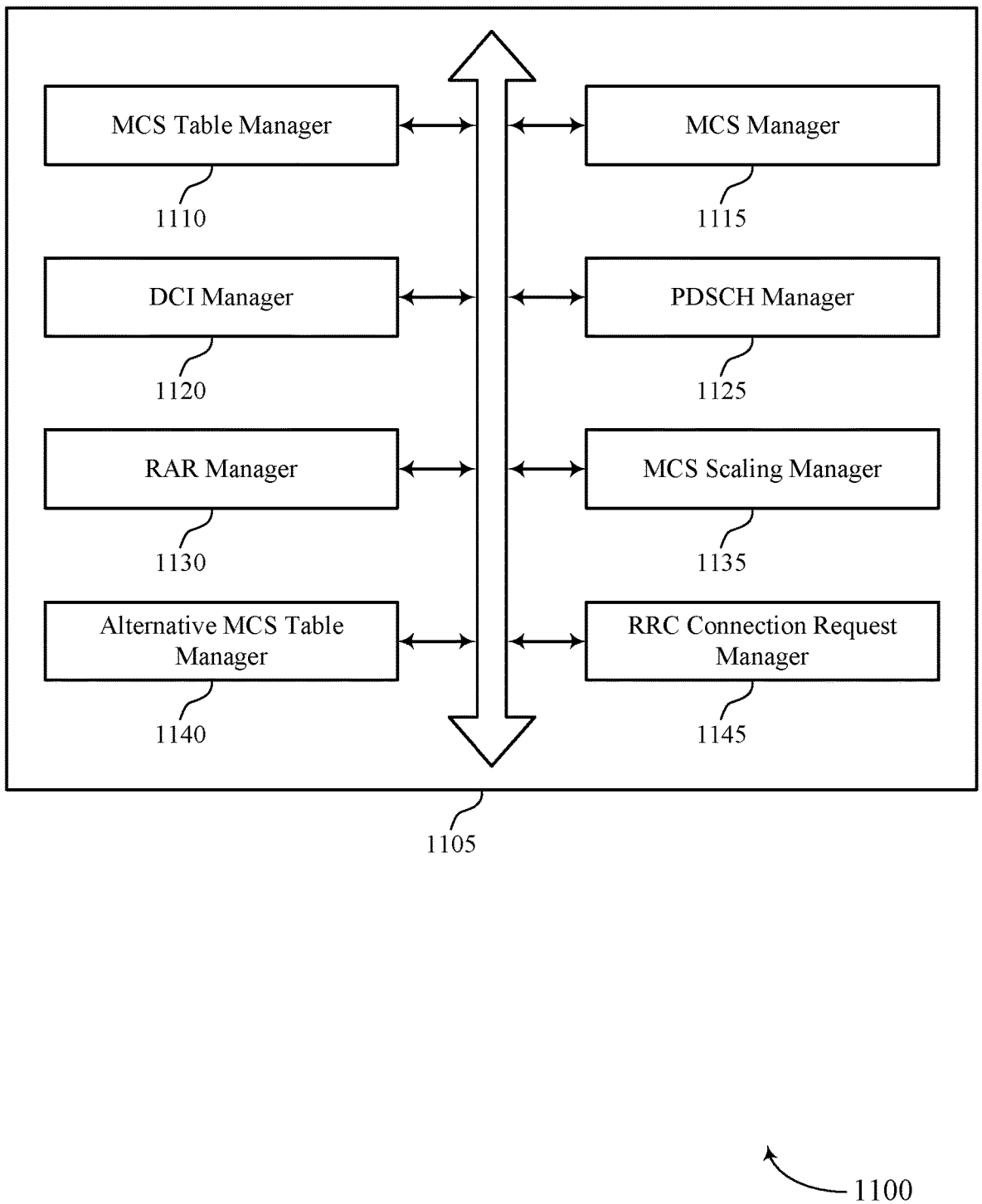
FIG. 11 shows a block diagram of a device that supports alternative MCS signaling in accordance with aspects of the present disclosure.

FIG. 11 shows a block diagram 1100 of a communications manager 1105 that supports alternative MCS signaling in accordance with aspects of the present disclosure. The communications manager 1105 may be an example of aspects of a communications manager 915, a communications manager 1015, or a communications manager 1210 described herein. The communications manager 1105 may include an MCS table manager 1110, an MCS manager 1115, a DCI manager 1120, a PDSCH manager 1125, a RAR manager 1130, an MCS scaling manager 1135, an alternative MCS table manager 1140, and an RRC connection request manager 1145. Each of these modules may communicate, directly or indirectly, with one another (e.g., via one or more buses).

The MCS table manager 1110 may identify a default set of MCS values. In some examples, the MCS table manager 1110 may determine whether the MCS value for the PDSCH transmission is included in the default set of MCS values. In some examples, the MCS table manager 1110 may identify a default set of MCS values. In some examples, the MCS table manager 1110 may determine whether the MCS value for the RRC connection request message is included in the default set of MCS values. In some examples, the MCS table manager 1110 may identify an MCS value of the default set of MCS values. The MCS manager 1115 may determine an MCS value for a PDSCH transmission. In some examples, the MCS manager 1115 may determine an MCS value for an RRC connection request message.

The DCI manager 1120 may transmit, to a UE, a DCI message including an indication of a scaling factor, wherein the indication of a scaling factor comprises an indication of whether the MCS value for the PDSCH transmission is included in the default set of MCS values. In some cases, the DCI message is scrambled with a RA-RNTI, a SI-RNTI, a P-RNTI, or a TC-RNTI. In some cases, the indication of whether the MCS value for the PDSCH transmission is included in the default set of MCS values includes at least one bit of a reserved field of the DCI message. In some cases, the indication of the MCS value of the second set of MCS values includes at least one bit of a reserved field of the DCI message. In some cases, the indication of whether the MCS value for the RRC connection request message is included in the default set of MCS values includes at least one bit of a reserved field of the DCI message.

The PDSCH manager 1125 may transmit, to the UE, the PDSCH transmission based on the default set of MCS values and the scaling factor. In some cases, the PDSCH transmission includes a RAR message. In some cases, the PDSCH transmission includes a second message (Msg2) in a random access procedure.

The RAR manager 1130 may transmit, to a UE, a RAR message including an indication of a scaling factor, wherein the indication of a scaling factor comprises an indication of whether the MCS value for the RRC connection request message is included in the default set of MCS values. In some examples, the RAR manager 1130 may receive, from the UE, a random access preamble, where the PDSCH transmission is transmitted in response to the random access preamble. In some cases, the RAR message includes a second message (Msg2) in a random access procedure; and the RRC connection request message includes a third message (Msg3) in the random access procedure.

In some cases, the indication that the MCS value for the RRC connection request message is included in the second set of MCS values includes at least one bit of a reserved field of the RAR message. The RRC connection request manager 1145 may receive, from the UE, the RRC connection request message based on the default set of MCS values and the scaling factor. In some cases, the RRC connection request message is in response to the RAR message.

The MCS scaling manager 1135 may transmit an indication of a scaling factor, where the scaling factor is based on the determined MCS value for the PDSCH transmission and the MCS value of the default set of MCS values. In some examples, the MCS scaling manager 1135 may transmit an indication of the MCS value of the default set of MCS values. In some examples, the MCS scaling manager 1135 may identify an MCS value of the default set of MCS values. In some examples, the MCS scaling manager 1135 may transmit an indication of a scaling factor, where the scaling factor is based on the determined MCS value for the RRC connection request message and the MCS value of the default set of MCS values. In some examples, the MCS scaling manager 1135 may transmit an indication of the MCS value of the default set of MCS values. In some cases, the scaling factor is based on a code rate associated with the determined MCS value for the PDSCH transmission and a code rate associated with the MCS value of the default set of MCS values. In some cases, the MCS value of the default set of MCS values corresponds to a lowest MCS value of the default set of MCS values. In some cases, the indication of the scaling factor is the indication of whether the MCS value for the PDSCH transmission is included in the default set of MCS values. In some cases, the scaling factor is based on a code rate associated with the determined MCS value for the RRC connection request message and a code rate associated with the MCS value of the default set of MCS values. In some cases, the MCS value of the default set of MCS values corresponds to a lowest MCS value of the default set of MCS values. In some cases, the indication of the scaling factor is the indication of whether the MCS value for the RRC connection request message is included in the default set of MCS values.

The alternative MCS table manager 1140 may transmit an indication of an MCS value of a second set of MCS values, where the MCS value of the second set of MCS values is based on the default set of MCS values and the scaling factor. In some examples, the alternative MCS table manager 1140 may transmit an indication that the MCS value for the RRC connection request message is included in a second set of MCS values. In some examples, the alternative MCS table manager 1140 may transmit an indication of an MCS value of the second set of MCS values, where the MCS value of the second set of MCS values is based on the determined MCS value for the RRC connection request message.

In some cases, the MCS value of the second set of MCS values indicates a code rate, a modulation scheme, or a combination thereof. In some cases, the indication of the MCS value of the second set of MCS values includes an MCS index and the indication of whether the MCS value for the PDSCH transmission is included in the second set of MCS values. In some cases, the indication of the MCS value of the second set of MCS values is the indication that the MCS value for the PDSCH transmission is included in the second set of MCS values. In some cases, the indication that the MCS value for the PDSCH transmission is included in the second set of MCS values is the indication of whether the MCS value for the PDSCH transmission is included in the default set of MCS values. In some cases, the indication that the MCS value for the PDSCH transmission is included in the second set of MCS values further indicates an index associated with the second set of MCS values. In some cases, the MCS value of the second set of MCS values indicates a code rate, a modulation scheme, or a combination thereof. In some cases, the indication of the MCS value of the second set of MCS values is the indication that the MCS value for the RRC connection request message is included in the second set of MCS values.

In some cases, the indication of the MCS value of the second set of MCS values includes an MCS index and the indication that the MCS value for the RRC connection request message is included in the second set of MCS values. In some cases, the indication that the MCS value for the RRC connection request message is included in the second set of MCS values is the indication of whether the MCS value for the RRC connection request message is included in the default set of MCS values. In some cases, the indication that the MCS value for the RRC connection request message is included in the second set of MCS values further indicates an index associated with the second set of MCS values.

Figure 12:
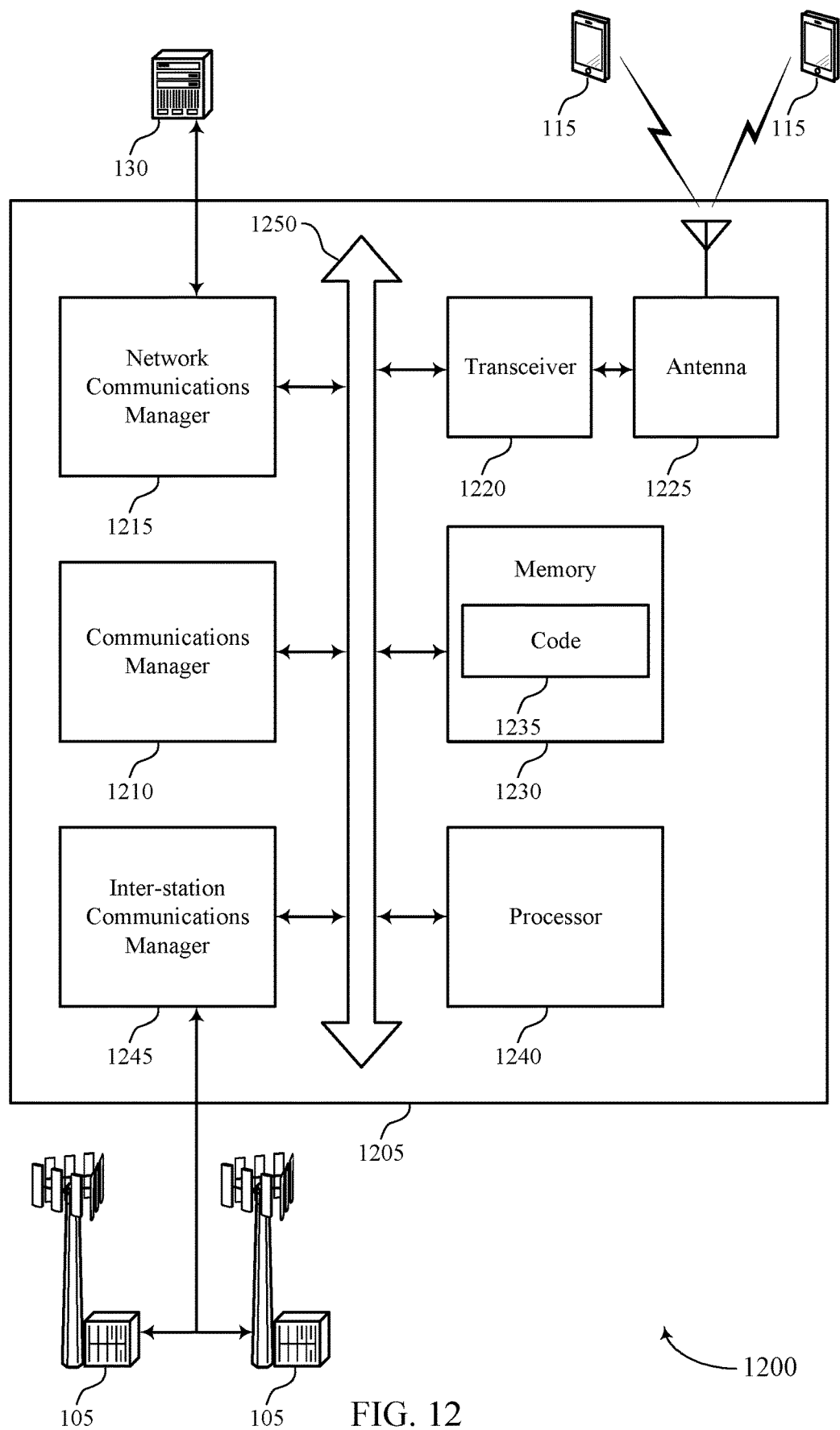
FIG. 12 shows a diagram of a system including a device that supports alternative MCS signaling in accordance with aspects of the present disclosure.

FIG. 12 shows a diagram of a system 1200 including a device 1205 that supports alternative MCS signaling in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may identify a default set of MCS values, determine whether the MCS value for the PDSCH transmission is included in the default set of MCS values, determine an MCS value for a PDSCH transmission, transmit, to a UE, a DCI message including an indication of a scaling factor, wherein the indication of a scaling factor comprises an indication of whether the MCS value for the PDSCH transmission is included in the default set of MCS values, and transmit, to the UE, the PDSCH transmission based on the default set of MCS values and the scaling factor. The communications manager 1210 may also identify a default set of MCS values, determine whether the MCS value for the RRC connection request message is included in the default set of MCS values, determine an MCS value for an RRC connection request message, transmit, to a UE, a RAR message including an indication of a scaling factor, wherein the indication of a scaling factor comprises an indication of whether the MCS value for the RRC connection request message is included in the default set of MCS values, and receive, from the UE, the RRC connection request message based on the default set of MCS values and the scaling factor.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device to perform various functions (e.g., functions or tasks supporting alternative MCS signaling).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
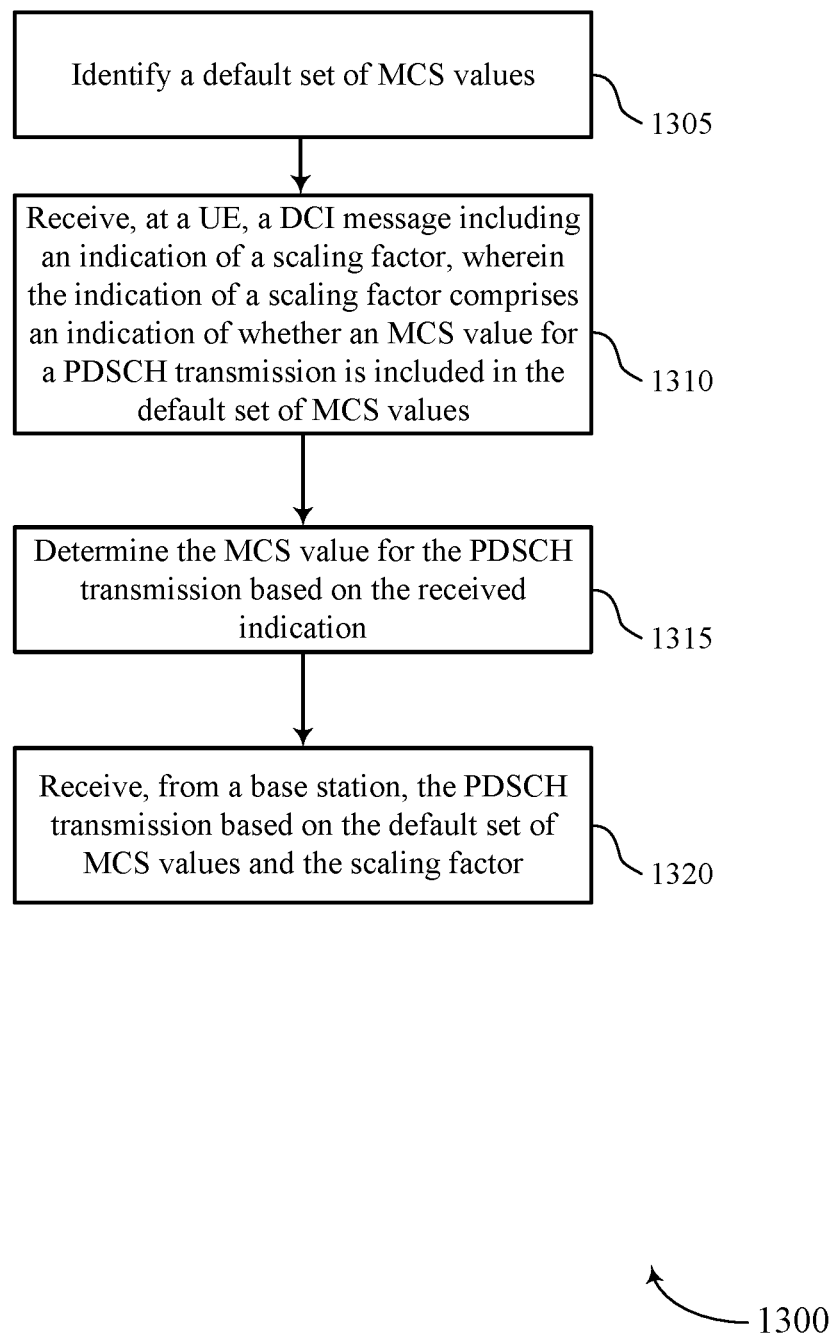
FIGS. 13 through 19 show flowcharts illustrating methods that support alternative MCS signaling in accordance with aspects of the present disclosure.

FIG. 13 shows a flowchart illustrating a method 1300 that supports alternative MCS signaling in accordance with aspects of the present disclosure. The operations of method 1300 may be implemented by a UE 115 or its components as described herein. For example, the operations of method 1300 may be performed by a communications manager as described with reference to FIGS. 5 to 8. In some examples, a UE may execute a set of instructions to control the functional elements of the UE to perform the functions described below. Additionally or alternatively, a UE may perform aspects of the functions described below using special-purpose hardware.

At 1305, the UE may identify a default set of MCS values. The operations of 1305 may be performed according to the methods described herein. In some examples, aspects of the operations of 1305 may be performed by an MCS table manager as described with reference to FIGS. 5 to 8.

At 1310, the UE may receive, at a UE, a DCI message including an indication of a scaling factor, wherein the indication of a scaling factor comprises an indication of whether an MCS value for a PDSCH transmission is included in the default set of MCS values. The operations of 1310 may be performed according to the methods described herein. In some examples, aspects of the operations of 1310 may be performed by a DCI manager as described with reference to FIGS. 5 to 8.

At 1315, the UE may determine the MCS value for the PDSCH transmission based on the received indication. The operations of 1315 may be performed according to the methods described herein. In some examples, aspects of the operations of 1315 may be performed by an MCS manager as described with reference to FIGS. 5 to 8.

At 1320, the UE may receive, from a base station, the PDSCH transmission based on the default set of MCS values and the scaling factor. The operations of 1320 may be performed according to the methods described herein. In some examples, aspects of the operations of 1320 may be performed by a PDSCH manager as described with reference to FIGS. 5 to 8.

Figure 14:
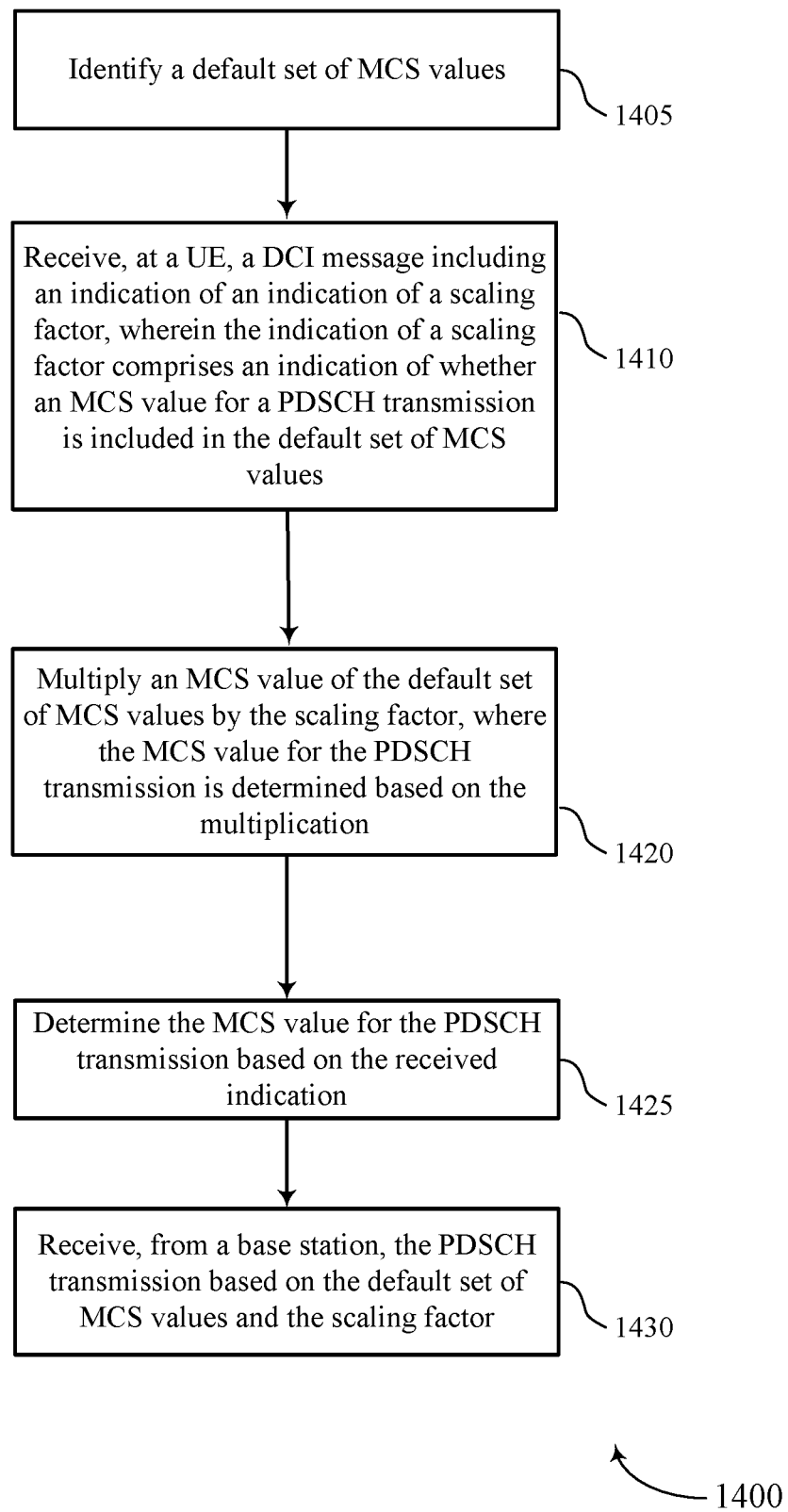

FIG. 14 shows a flowchart illustrating a method 1400 that supports alternative MCS signaling in accordance with aspects of the present disclosure. The operations of method 1400 may be implemented by a UE 115 or its components as described herein. For example, the operations of method 1400 may be performed by a communications manager as described with reference to FIGS. 5 to 8. In some examples, a UE may execute a set of instructions to control the functional elements of the UE to perform the functions described below. Additionally or alternatively, a UE may perform aspects of the functions described below using special-purpose hardware.

At 1405, the UE may identify a default set of MCS values. The operations of 1405 may be performed according to the methods described herein. In some examples, aspects of the operations of 1405 may be performed by an MCS table manager as described with reference to FIGS. 5 to 8.

At 1410, the UE may receive, at a UE, a DCI message including an indication of a scaling factor, wherein the indication of a scaling factor comprises an indication of whether an MCS value for a PDSCH transmission is included in the default set of MCS values. The operations of 1410 may be performed according to the methods described herein. In some examples, aspects of the operations of 1410 may be performed by a DCI manager as described with reference to FIGS. 5 to 8.

At 1420, the UE may multiply an MCS value of the default set of MCS values by the scaling factor, where the MCS value for the PDSCH transmission is determined based on the multiplication. The operations of 1420 may be performed according to the methods described herein. In some examples, aspects of the operations of 1420 may be performed by an MCS scaling manager as described with reference to FIGS. 5 to 8.

At 1425, the UE may determine the MCS value for the PDSCH transmission based on the received indication. The operations of 1425 may be performed according to the methods described herein. In some examples, aspects of the operations of 1425 may be performed by an MCS manager as described with reference to FIGS. 5 to 8.

At 1430, the UE may receive, from a base station, the PDSCH transmission based on the default set of MCS values and the scaling factor. The operations of 1430 may be performed according to the methods described herein. In some examples, aspects of the operations of 1430 may be performed by a PDSCH manager as described with reference to FIGS. 5 to 8.

Figure 15:
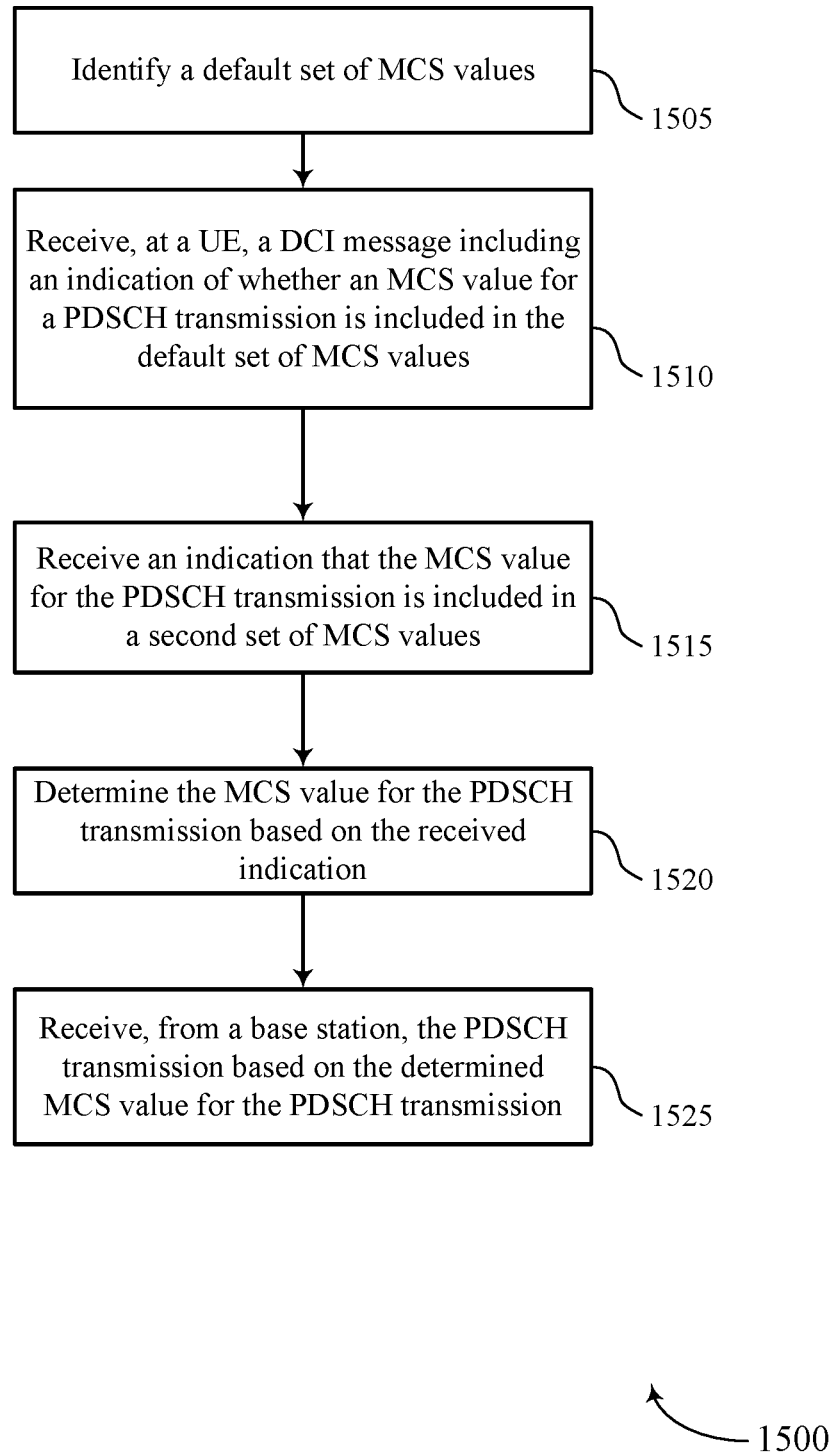

FIG. 15 shows a flowchart illustrating a method 1500 that supports alternative MCS signaling in accordance with aspects of the present disclosure. The operations of method 1500 may be implemented by a UE 115 or its components as described herein. For example, the operations of method 1500 may be performed by a communications manager as described with reference to FIGS. 5 to 8. In some examples, a UE may execute a set of instructions to control the functional elements of the UE to perform the functions described below. Additionally or alternatively, a UE may perform aspects of the functions described below using special-purpose hardware.

At 1505, the UE may identify a default set of MCS values. The operations of 1505 may be performed according to the methods described herein. In some examples, aspects of the operations of 1505 may be performed by an MCS table manager as described with reference to FIGS. 5 to 8.

At 1510, the UE may receive, at a UE, a DCI message including an indication of whether an MCS value for a PDSCH transmission is included in the default set of MCS values. The operations of 1510 may be performed according to the methods described herein. In some examples, aspects of the operations of 1510 may be performed by a DCI manager as described with reference to FIGS. 5 to 8.

At 1515, the UE may receive an indication of an MCS value of a second set of MCS values, where the MCS value for the PDSCH transmission is determined based on the received indication of the MCS value of the second set of MCS values. The operations of 1515 may be performed according to the methods described herein. In some examples, aspects of the operations of 1515 may be performed by an alternative MCS table manager as described with reference to FIGS. 5 to 8.

At 1520, the UE may determine the MCS value for the PDSCH transmission based on the received indication. The operations of 1520 may be performed according to the methods described herein. In some examples, aspects of the operations of 1520 may be performed by an MCS manager as described with reference to FIGS. 5 to 8.

At 1525, the UE may receive, from a base station, the PDSCH transmission based on the determined MCS value for the PDSCH transmission. The operations of 1525 may be performed according to the methods described herein. In some examples, aspects of the operations of 1525 may be performed by a PDSCH manager as described with reference to FIGS. 5 to 8.

Figure 16:
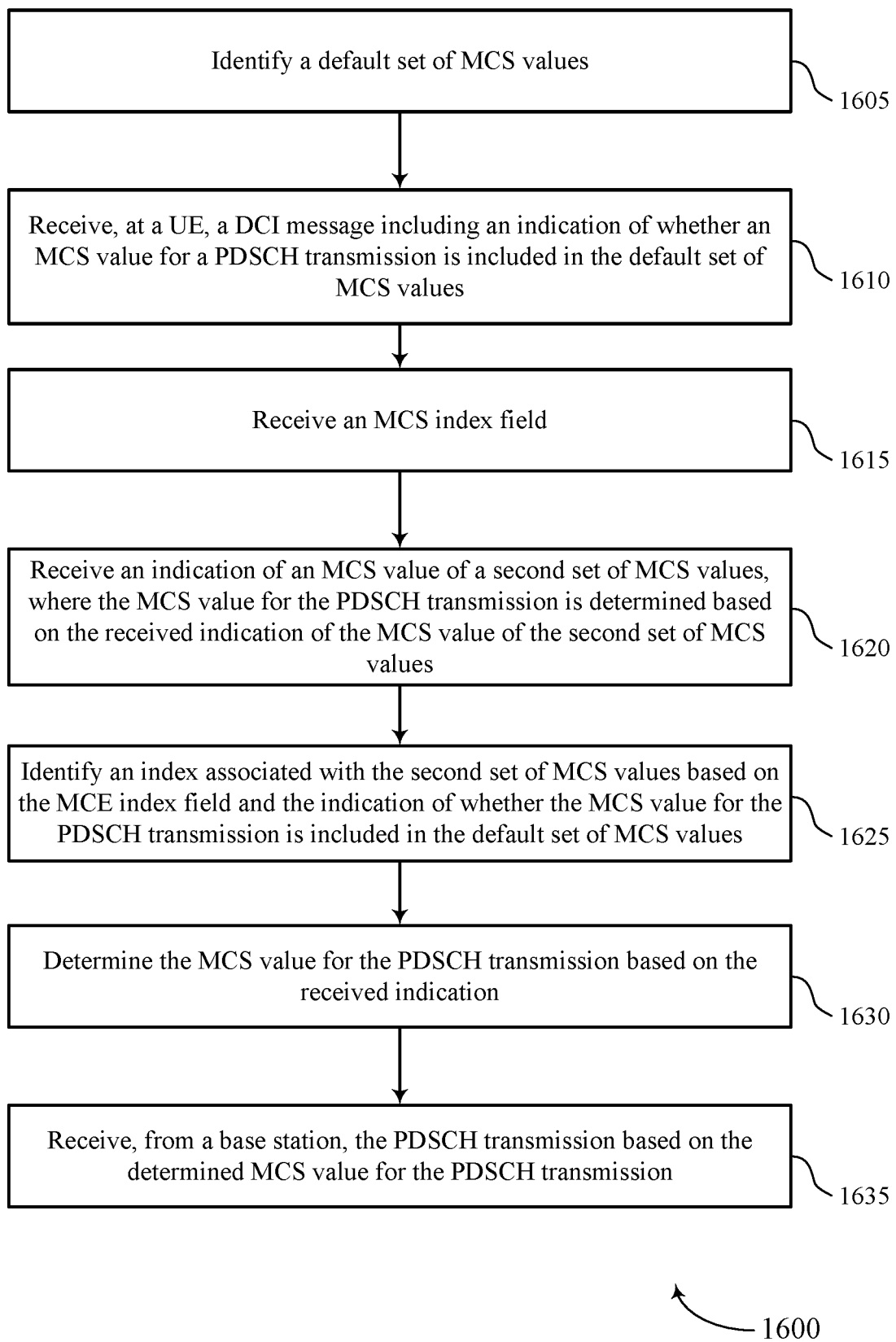

FIG. 16 shows a flowchart illustrating a method 1600 that supports alternative MCS signaling in accordance with aspects of the present disclosure. The operations of method 1600 may be implemented by a UE 115 or its components as described herein. For example, the operations of method 1600 may be performed by a communications manager as described with reference to FIGS. 5 to 8. In some examples, a UE may execute a set of instructions to control the functional elements of the UE to perform the functions described below. Additionally or alternatively, a UE may perform aspects of the functions described below using special-purpose hardware.

At 1605, the UE may identify a default set of MCS values. The operations of 1605 may be performed according to the methods described herein. In some examples, aspects of the operations of 1605 may be performed by an MCS table manager as described with reference to FIGS. 5 to 8.

At 1610, the UE may receive, at a UE, a DCI message including an indication of whether an MCS value for a PDSCH transmission is included in the default set of MCS values. The operations of 1610 may be performed according to the methods described herein. In some examples, aspects of the operations of 1610 may be performed by a DCI manager as described with reference to FIGS. 5 to 8.

At 1615, the UE may receive an MCS index field. The operations of 1615 may be performed according to the methods described herein. In some examples, aspects of the operations of 1615 may be performed by an alternative MCS table manager as described with reference to FIGS. 5 to 8.

At 1620, the UE may receive an indication of an MCS value of a second set of MCS values, where the MCS value for the PDSCH transmission is determined based on the received indication of the MCS value of the second set of MCS values. The operations of 1620 may be performed according to the methods described herein. In some examples, aspects of the operations of 1620 may be performed by an alternative MCS table manager as described with reference to FIGS. 5 to 8.

At 1625, the UE may identify an index associated with the second set of MCS values based on the MCE index field and the indication of whether the MCS value for the PDSCH transmission is included in the default set of MCS values. The operations of 1625 may be performed according to the methods described herein. In some examples, aspects of the operations of 1625 may be performed by an alternative MCS table manager as described with reference to FIGS. 5 to 8.

At 1630, the UE may determine the MCS value for the PDSCH transmission based on the received indication. The operations of 1630 may be performed according to the methods described herein. In some examples, aspects of the operations of 1630 may be performed by an MCS manager as described with reference to FIGS. 5 to 8.

At 1635, the UE may receive, from a base station, the PDSCH transmission based on the determined MCS value for the PDSCH transmission. The operations of 1635 may be performed according to the methods described herein. In some examples, aspects of the operations of 1635 may be performed by a PDSCH manager as described with reference to FIGS. 5 to 8.

Figure 17:
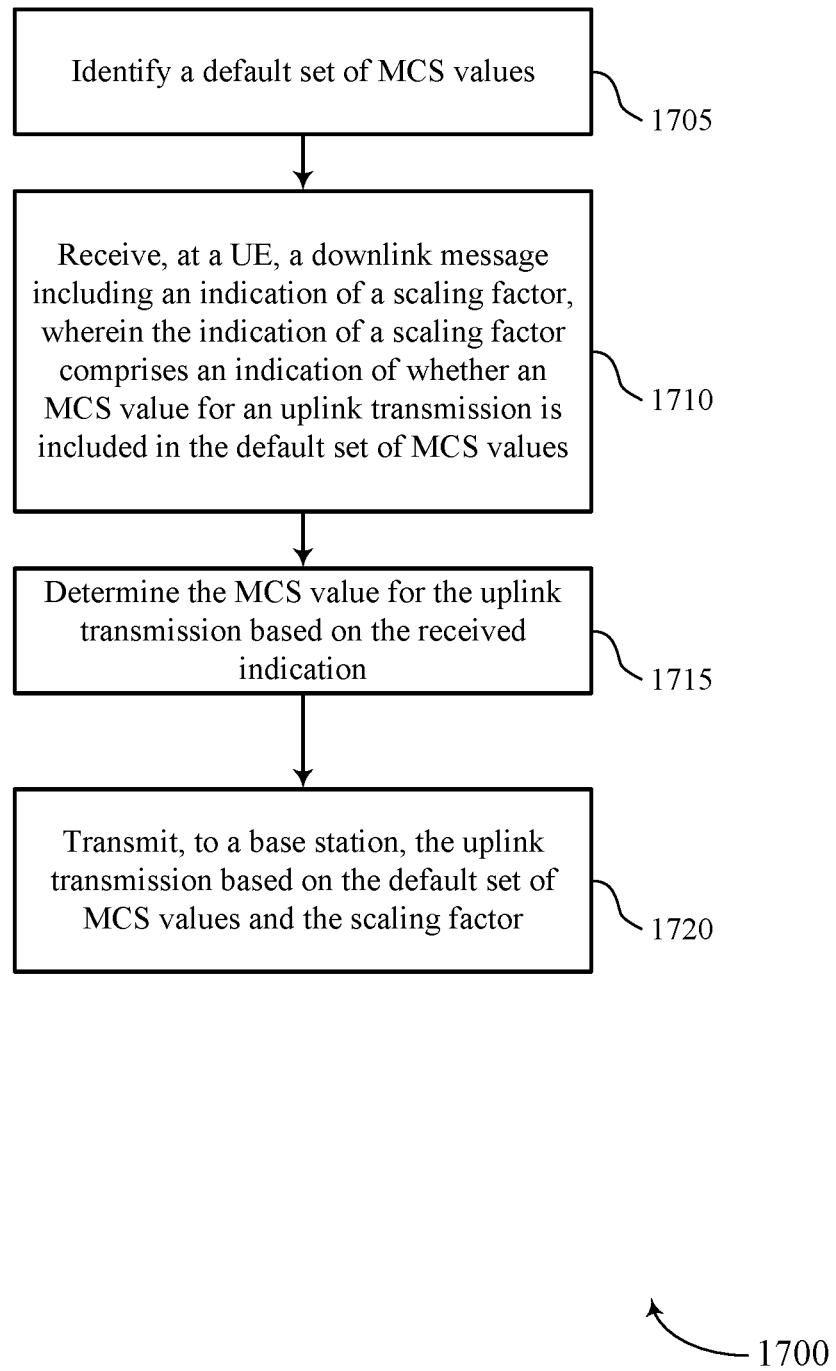

FIG. 17 shows a flowchart illustrating a method 1700 that supports alternative MCS signaling in accordance with aspects of the present disclosure. The operations of method 1700 may be implemented by a UE 115 or its components as described herein. For example, the operations of method 1700 may be performed by a communications manager as described with reference to FIGS. 5 to 8. In some examples, a UE may execute a set of instructions to control the functional elements of the UE to perform the functions described below. Additionally or alternatively, a UE may perform aspects of the functions described below using special-purpose hardware.

At 1705, the UE may identify a default set of MCS values. The operations of 1705 may be performed according to the methods described herein. In some examples, aspects of the operations of 1705 may be performed by an MCS table manager as described with reference to FIGS. 5 to 8.

At 1710, the UE may receive, at a UE, a downlink message including an indication of a scaling factor, wherein the indication of a scaling factor comprises an indication of whether an MCS value for an uplink transmission is included in the default set of MCS values. The operations of 1710 may be performed according to the methods described herein. In some examples, aspects of the operations of 1710 may be performed by a RAR manager as described with reference to FIGS. 5 to 8.

At 1715, the UE may determine the MCS value for the uplink transmission based on the received indication. The operations of 1715 may be performed according to the methods described herein. In some examples, aspects of the operations of 1715 may be performed by an MCS manager as described with reference to FIGS. 5 to 8.

At 1720, the UE may transmit, to a base station, the uplink transmission based on the default set of MCS values and the scaling factor. The operations of 1720 may be performed according to the methods described herein. In some examples, aspects of the operations of 1720 may be performed by an RRC connection request manager as described with reference to FIGS. 5 to 8.

Figure 18:
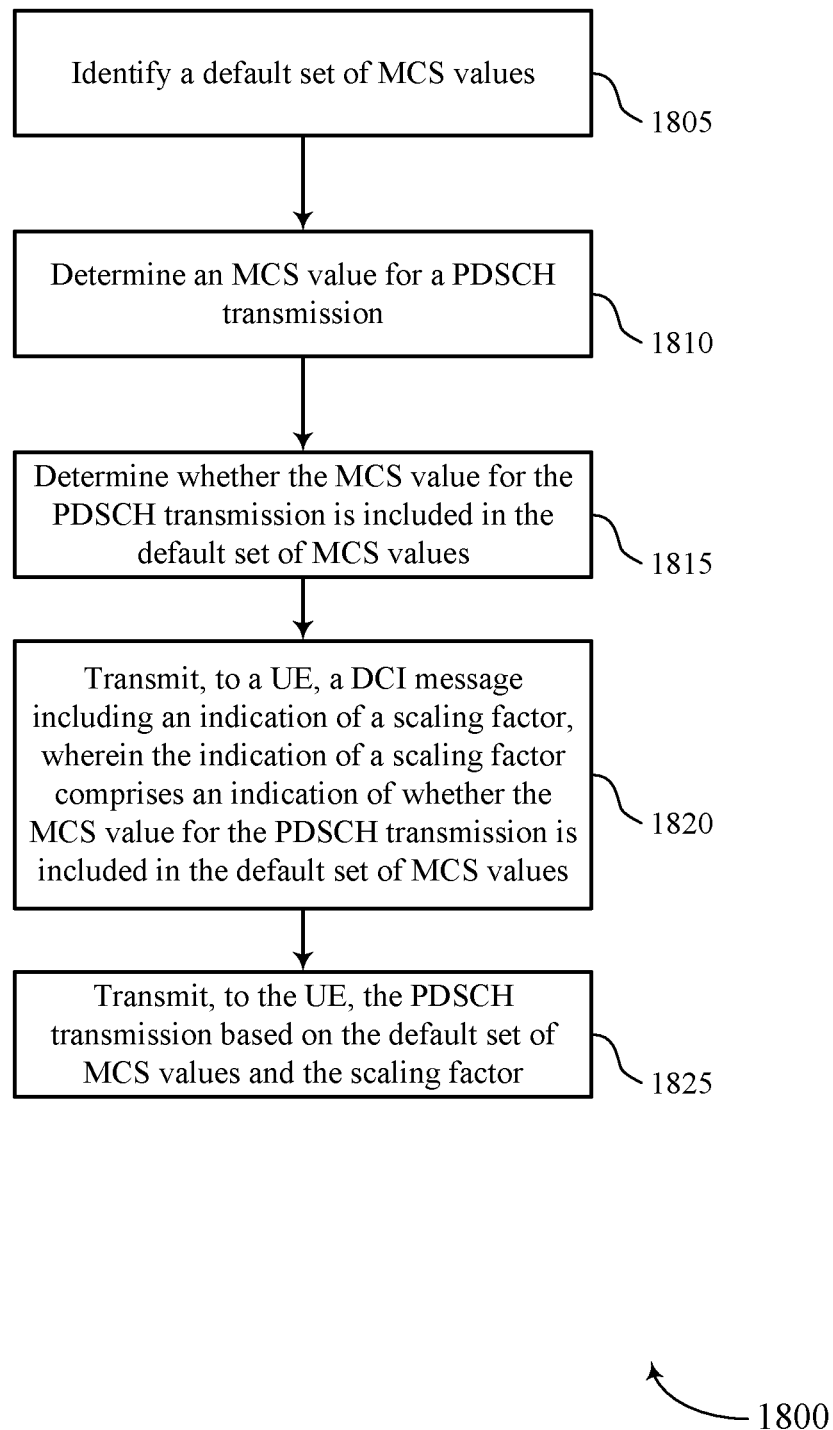

FIG. 18 shows a flowchart illustrating a method 1800 that supports alternative MCS signaling in accordance with aspects of the present disclosure. The operations of method 1800 may be implemented by a base station 105 or its components as described herein. For example, the operations of method 1800 may be performed by a communications manager as described with reference to FIGS. 9 to 12. In some examples, a base station may execute a set of instructions to control the functional elements of the base station to perform the functions described below. Additionally or alternatively, a base station may perform aspects of the functions described below using special-purpose hardware.

At 1805, the base station may identify a default set of MCS values. The operations of 1805 may be performed according to the methods described herein. In some examples, aspects of the operations of 1805 may be performed by an MCS table manager as described with reference to FIGS. 9 to 12.

At 1810, the base station may determine an MCS value for a PDSCH transmission. The operations of 1810 may be performed according to the methods described herein. In some examples, aspects of the operations of 1810 may be performed by an MCS manager as described with reference to FIGS. 9 to 12.

At 1815, the base station may determine whether the MCS value for the PDSCH transmission is included in the default set of MCS values. The operations of 1815 may be performed according to the methods described herein. In some examples, aspects of the operations of 1815 may be performed by an MCS table manager as described with reference to FIGS. 9 to 12.

At 1820, the base station may transmit, to a UE, a DCI message including an indication of a scaling factor, wherein the indication of a scaling factor comprises an indication of whether the MCS value for the PDSCH transmission is included in the default set of MCS values. The operations of 1820 may be performed according to the methods described herein. In some examples, aspects of the operations of 1820 may be performed by a DCI manager as described with reference to FIGS. 9 to 12.

At 1825, the base station may transmit, to the UE, the PDSCH transmission based on the default set of MCS values and the scaling factor. The operations of 1825 may be performed according to the methods described herein. In some examples, aspects of the operations of 1825 may be performed by a PDSCH manager as described with reference to FIGS. 9 to 12.

Figure 19:
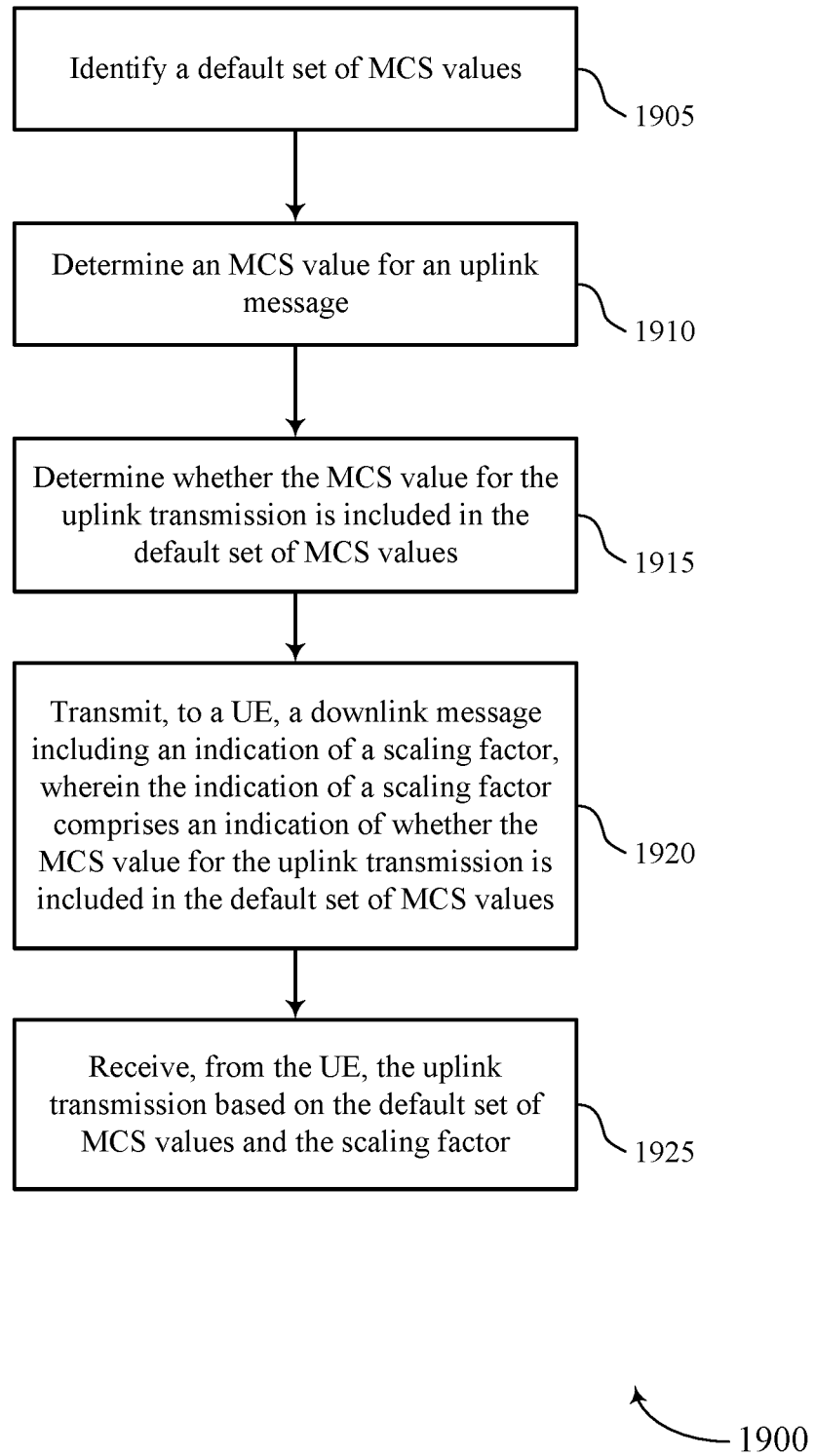

FIG. 19 shows a flowchart illustrating a method 1900 that supports alternative MCS signaling in accordance with aspects of the present disclosure. The operations of method 1900 may be implemented by a base station 105 or its components as described herein. For example, the operations of method 1900 may be performed by a communications manager as described with reference to FIGS. 9 to 12. In some examples, a base station may execute a set of instructions to control the functional elements of the base station to perform the functions described below. Additionally or alternatively, a base station may perform aspects of the functions described below using special-purpose hardware.

At 1905, the base station may identify a default set of MCS values. The operations of 1905 may be performed according to the methods described herein. In some examples, aspects of the operations of 1905 may be performed by an MCS table manager as described with reference to FIGS. 9 to 12.

At 1910, the base station may determine an MCS value for an uplink transmission. The operations of 1910 may be performed according to the methods described herein. In some examples, aspects of the operations of 1910 may be performed by an MCS manager as described with reference to FIGS. 9 to 12.

At 1915, the base station may determine whether the MCS value for the uplink transmission is included in the default set of MCS values. The operations of 1915 may be performed according to the methods described herein. In some examples, aspects of the operations of 1915 may be performed by an MCS table manager as described with reference to FIGS. 9 to 12.

At 1920, the base station may transmit, to a UE, a downlink message including an indication of a scaling factor, wherein the indication of a scaling factor comprises an indication of whether the MCS value for the uplink transmission is included in the default set of MCS values. The operations of 1920 may be performed according to the methods described herein. In some examples, aspects of the operations of 1920 may be performed by a RAR manager as described with reference to FIGS. 9 to 12.

At 1925, the base station may receive, from the UE, the uplink transmission based on the default set of MCS values and the scaling factor. The operations of 1925 may be performed according to the methods described herein. In some examples, aspects of the operations of 1925 may be performed by an RRC connection request manager as described with reference to FIGS. 9 to 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a set of modulation coding scheme (MCS) values;
   receiving, at a user equipment (UE), a random access response (RAR) message comprising an indication of a scaling factor;
   multiplying, by the scaling factor, a parameter associated with an MCS value of the set of MCS values; and
   transmitting, to a base station, a radio resource control (RRC) connection message based at least in part on the set of MCS values and the multiplication.

2. The method of claim 1, further comprising:
   transmitting the RRC connection request message in response to the RAR message.

3. The method of claim 1, wherein the RAR message comprises a second message (Msg2) in a random access procedure and the RRC connection request message comprises a third message (Msg3) in the random access procedure.

4. The method of claim 1, further comprising:
   determining an MCS value for the RRC connection request message based at least in part on multiplying the parameter by the scaling factor.

5. The method of claim 1, wherein:
   the parameter comprises a code rate associated with the MCS value of the set of MCS values; and
   a code rate for the RRC connection request message is based at least in part on the multiplication.

6. The method of claim 1, further comprising:
   receiving an indication of the MCS value of the set of MCS values, wherein the multiplication is based at least in part on the indication of the MCS value of the set of MCS values.

7. The method of claim 1, wherein the MCS value of the set of MCS values corresponds to a lowest MCS value of the set of MCS values.

8. The method of claim 1, wherein the indication of the scaling factor comprises an indication of whether the MCS value for the RRC connection request message is included in the set of MCS values.

9. A method for wireless communication, comprising:
   identifying a set of modulation coding scheme (MCS) values;
   transmitting, to a user equipment (UE), a random access response (RAR) message comprising an indication of a scaling factor for a radio resource control (RRC) connection request message, wherein the scaling factor is for a parameter associated with an MCS value of the set of MCS values; and
   receiving, from the UE, the RRC connection request message based at least in part on the set of MCS values and a multiplication of the scaling factor and the parameter associated with the MCS value of the set of MCS values.

10. The method of claim 9, wherein the RRC connection request message is in response to the RAR message.

11. The method of claim 9, wherein the RAR message comprises a second message (Msg2) in a random access procedure; and the RRC connection request message comprises a third message (Msg3) in the random access procedure.

12. The method of claim 9, wherein the scaling factor is based at least in part on an MCS value for the RRC connection request message and the MCS value of the set of MCS values.

13. The method of claim 12, further comprising:
   transmitting an indication of the MCS value of the set of MCS values.

14. The method of claim 12, wherein the MCS value of the set of MCS values corresponds to a lowest MCS value of the set of MCS values.

15. The method of claim 9, wherein the parameter associated with the MCS value of the set of MCS values comprises a code rate.

16. The method of claim 9, wherein the indication of the scaling factor comprises an indication of whether an MCS value for the RRC connection request message is included in the set of MCS values.

17. A method for wireless communication, comprising:
   identifying a set of modulation coding scheme (MCS) values;
   receiving, at a user equipment (UE), a downlink control information (DCI) message comprising an indication of a scaling factor;
   multiplying, by the scaling factor, a parameter associated with an MCS value of the set of MCS values; and receiving, from a base station, the PDSCH transmission based at least in part on the set of MCS values and the multiplication.

18. The method of claim 17, wherein the PDSCH transmission comprises a random access response (RAR) message, further comprising:
transmitting, to the base station, a random access preamble, wherein the RAR message is in response to the random access preamble.

19. The method of claim 18, wherein the RAR message comprises a second message (Msg2) in a random access procedure.

20. The method of claim 18, wherein:
the parameter comprises a code rate associated with the MCS value of the set of MCS values; and
a code rate for the PDSCH transmission is based at least in part on the multiplication.

21. The method of claim 18, further comprising:
receiving an indication of the MCS value of the set of MCS values, wherein the multiplication is based at least in part on the indication of the MCS value of the set of MCS values.

22. The method of claim 18, wherein the MCS value of the set of MCS values corresponds to a lowest MCS value of the set of MCS values.

23. The method of claim 17, further comprising:
determining an MCS value for the PDSCH transmission based at least in part on multiplying the parameter by the scaling factor.

24. A method for wireless communication, comprising:
identifying a set of modulation coding scheme (MCS) values;
transmitting, to a user equipment (UE), a downlink control information (DCI) message comprising an indication of a scaling factor for a physical downlink shared channel (PDSCH) transmission, wherein the scaling factor is for a parameter associated with an MCS value of the set of MCS values; and
transmitting, to the UE, the PDSCH transmission based at least in part on the set of MCS values and a multiplication of the scaling factor and the parameter associated with the MCS value of the set of MCS values.

25. The method of claim 24, wherein the PDSCH transmission comprises a random access response (RAR) message, further comprising:
receiving, from the UE, a random access preamble, wherein the RAR message is transmitted in response to the random access preamble.

26. The method of claim 25, wherein the RAR message comprises a second message (Msg2) in a random access procedure.

27. The method of claim 24, wherein the scaling factor is based at least in part on an MCS value for the PDSCH transmission and the MCS value of the set of MCS values.

28. The method of claim 27, further comprising:
transmitting an indication of the MCS value of the set of MCS values.

29. The method of claim 27, wherein the MCS value of the set of MCS values corresponds to a lowest MCS value of the set of MCS values.

30. The method of claim 24, wherein the parameter associated with the MCS value of the set of MCS values comprises a code rate.

* * * * *